(12) United States Patent
Yoo

(10) Patent No.: US 11,670,985 B2
(45) Date of Patent: Jun. 6, 2023

(54) METHOD FOR MANUFACTURING COOLING DEVICE AND MOTOR HOUSING COOLING DEVICE USING SAME

(71) Applicant: MH TECHNOLOGIES INC., Incheon (KR)

(72) Inventor: Jin Ho Yoo, Seoul (KR)

(73) Assignee: MH TECHNOLOGIES INC., Incheon (KR)

( * ) Notice: Subject to any disclaimer, the term of this patent is extended or adjusted under 35 U.S.C. 154(b) by 607 days.

(21) Appl. No.: 16/643,380

(22) PCT Filed: Aug. 31, 2018

(86) PCT No.: PCT/KR2018/010128
§ 371 (c)(1),
(2) Date: Feb. 28, 2020

(87) PCT Pub. No.: WO2019/045512
PCT Pub. Date: Mar. 7, 2019

(65) Prior Publication Data
US 2020/0195095 A1 Jun. 18, 2020

(30) Foreign Application Priority Data

Sep. 4, 2017 (KR) .................. 10-2017-0112529
Sep. 4, 2017 (KR) .................. 10-2017-0112547
(Continued)

(51) Int. Cl.
*H02K 19/04* (2006.01)
*H02K 9/193* (2006.01)
(Continued)

(52) U.S. Cl.
CPC ............. *H02K 9/193* (2013.01); *B22D 19/04* (2013.01); *B60K 11/02* (2013.01); *H02K 5/203* (2021.01); *H02K 5/24* (2013.01); *H02K 15/14* (2013.01)

(58) Field of Classification Search
CPC .......... H02K 9/193; H02K 5/203; H02K 5/24; B22K 11/02; B60K 11/02
(Continued)

(56) References Cited

U.S. PATENT DOCUMENTS

2010/0247008 A1 9/2010 Muramatsu

FOREIGN PATENT DOCUMENTS

| CN | 102035306 A | 4/2011 |
|---|---|---|
| DE | 10026546 A1 | 11/2001 |

(Continued)

OTHER PUBLICATIONS

Sun J C et al., "Predictions of total loss factors of structure, part II: Loss factors of sand-filled structure", Journal of Sound and Vibration, Jan. 22, 1986, pp. 243-257, vol. 104, No. 2.

*Primary Examiner* — Terrance L Kenerly
(74) *Attorney, Agent, or Firm* — Bridgeway IP Law Group, PLLC; Sang Ho Lee; Hyun Woo Shin

(57) ABSTRACT

Provided is a method for manufacturing a cooling device and a motor housing cooling device manufactured using same, the method including the steps of: making a cooling pipe and forming the cooling pipe to a shape capable of being buried in a housing body; filling the cooling pipe with a support material; making a portion divided from the housing body as a jig body so as to support the cooling pipe against the jib body in an injection mold of the housing body; locating the cooling pipe in the injection mold of the housing body in such a manner as to be supported against the jig body and injection-molding the housing body; and after
(Continued)

the injection molding, removing the support material from the cooling pipe.

13 Claims, 30 Drawing Sheets

(30) Foreign Application Priority Data

| Sep. 4, 2017 | (KR) | 10-2017-0112564 |
|---|---|---|
| Sep. 4, 2017 | (KR) | 10-2017-0112582 |
| Sep. 4, 2017 | (KR) | 10-2017-0112588 |
| Sep. 4, 2017 | (KR) | 10-2017-0112595 |
| Sep. 4, 2017 | (KR) | 10-2017-0112606 |
| Sep. 4, 2017 | (KR) | 10-2017-0112611 |

(51) Int. Cl.

| *B22D 19/04* | (2006.01) |
|---|---|
| *B60K 11/02* | (2006.01) |
| *H02K 5/24* | (2006.01) |
| *H02K 15/14* | (2006.01) |
| *H02K 5/20* | (2006.01) |

(58) Field of Classification Search
USPC .......................................................... 310/51
See application file for complete search history.

(56) References Cited

FOREIGN PATENT DOCUMENTS

| DE | 102008039208 A1 | 2/2009 |
|---|---|---|
| JP | 56-114566 A | 9/1981 |
| JP | 08-158934 A | 6/1996 |
| JP | 09-285084 A | 10/1997 |
| JP | 2003-199318 A | 7/2003 |
| JP | 2004-306061 A | 11/2004 |
| JP | 2007-174886 A | 7/2007 |
| JP | 2009-240152 A | 10/2009 |
| JP | 2017-108579 A | 6/2017 |
| KR | 10-1996-0040512 A | 12/1996 |
| KR | 10-0214704 B1 | 8/1999 |
| KR | 10-1761677 B1 | 8/2017 |
| KR | 10-1767621 B1 | 8/2017 |
| WO | 2016/167022 A1 | 10/2016 |

METHOD FOR MANUFACTURING COOLING DEVICE AND MOTOR HOUSING COOLING DEVICE USING SAME

BACKGROUND OF THE INVENTION

Field of the Invention

The present invention relates to a method for manufacturing a cooling device and a motor housing cooling device manufactured using same, the motor housing cooling device being disposed in an electric vehicle.

Background of the Related Art

Various casting (gravity casting, low pressure casting, high pressure casting, etc.) and injection molding for molding metal or plastic products are used to manufacture a hollow product. So as to make the hollow product, generally, an upper product and a lower product having hollow portions formed thereon are prepared and then bonded or coupled to each other by means of bonding means. In this case, however, it is hard to manufacture a rigid product due to a stiffness problem at the bonded portion, incomplete assembling, or erroneous assembling.

In another conventional practice, accordingly, a long pipe whose inside is empty is seated onto a mold for making a product, and next, the mold is closed. So as to make a shape of the product, a molten metal is poured into the mold. Even in this case, however, there is a limit that the long pipe is not resistant with a pressure of the molten metal poured into the mold, so that if high pressure casting is carried out, the long pipe may be deformed or broken.

Accordingly, the hollow long pipe is filled with a specific material at a density of more than a given value, and after the molding for the product is carried out, the specific material is removed from the hollow long pipe. In the conventional practices, by the way, it is not easy to remove the specific material after the hollow product has been molded, and the manufacturing time becomes too long to be applied for mass production.

In the existing practices, the hollow product is made through a given tool or device, and a filler for forming a hollow portion of the hollow product, which is used for the given tool or device, has to be removed, so that disadvantageously, the process of making the hollow product becomes complicated and the given tool or device has to be additionally required.

On the other hand, a motor as a main component of a hybrid or electric vehicle converts electric energy into mechanical energy and includes a housing, a stator mounted on the housing, and a rotor rotatably inserted into the stator around a rotary shaft.

During the operating process of the motor, heat having a high temperature is generated from the rotor and the stator, and if a temperature of a coil in the motor becomes high, a wire resistance is increased and an electromagnetic force is decreased by the Curie effect, so that driving and power generation efficiencies of the motor become drastically deteriorated and the components of the motor become damaged due to heat load.

As the driving and power generation efficiencies of the motor become drastically deteriorated, a power loss occurs to make an efficiency of a power system related to the motor become decreased. So as to prevent the occurrence of such problems, accordingly, the motor is cool to maintain a high driving torque and a power generation efficiency thereof.

In the conventional practice, an inner housing and an outer housing are cast independently of each other, and so as to form a cooling channel between the inner housing and the outer housing, generally, they are press-fitted and sealed or welded to each other.

According to the conventional motor cooling method, by the way, a mold spotting gap occurs between the inner housing and the outer housing, thereby causing the cooling water to leak to make a cooling efficiency deteriorated. Further, a design freedom in the cooling channel is low to cause the flow paths of the input end and the output end s to be misaligned, thereby generating the presence of thermal cross-talk.

SUMMARY OF THE INVENTION

Accordingly, the present invention has been made in view of the above-mentioned problems occurring in the related art, and it is an object of the present invention to provide a method for manufacturing a hollow product and a hollow product manufactured using same that are capable of producing the hollow product having a high degree of perfection by means of a hollow portion forming pipe and a support material made of grains, a soluble material, or high temperature heat-resistant fibers.

It is another object of the present invention to provide a method for manufacturing a cooling device and a motor housing cooling device manufactured using same that are capable of improving a cooling efficiency, completely sealing a flow path and preventing presence of thermal cross-talk.

To accomplish the above-mentioned objects, according to one aspect of the present invention, there is provided a method for manufacturing a cooling device for circulating a cooling fluid along a cooling pipe, the method including the steps of: making the cooling pipe and forming the cooling pipe to a shape capable of being buried in a housing body; filling the cooling pipe with a support material; making a portion divided from the housing body as a jig body so as to support the cooling pipe against the jib body in an injection mold of the housing body; locating the cooling pipe in the injection mold of the housing body in such a manner as to be supported against the jig body and injection-molding the housing body; and after the injection molding, removing the support material from the cooling pipe.

To accomplish the above-mentioned objects, according to another aspect of the present invention, there is provided a motor housing cooling device including: a motor housing having a housing body having an accommodation space formed therein to locate a motor therein and a cover adapted to close the housing body; a helix cooling pipe buried helixly in the housing body in a longitudinal direction of the housing body in such a manner as to allow a cooling fluid to flow therealong; and a vibration absorbing pipe adapted to absorb vibrations and having a pipe-shaped body coupled to the side periphery of the helix cooling pipe and a vibration absorbing material filled in the body, wherein after the helix cooling pipe is filled with a removable support material and the vibration absorbing pipe with the vibration absorbing material, the helix cooling pipe and the vibration absorbing pipe are located in a housing body injection mold in such a manner as to mold the housing body with the helix cooling pipe and the vibration absorbing pipe buried therein by means of insert injection molding, and after molding, the support material filled in the helix cooling pipe is removed to allow the cooling fluid to be circulated through the helix cooling pipe so that the motor becomes cool.

To accomplish the above-mentioned objects, according to yet another aspect of the present invention, there is provided a motor housing cooling device including: a motor housing having a housing body having an accommodation space formed therein to locate a motor therein and a cover adapted to close the housing body; a U-shaped cooling pipe buried in form of zigzag in the housing body in an up and down direction of the housing body in such a manner as to allow a cooling fluid to flow therealong; and vibration absorbing pipes adapted to absorb vibrations, each vibration absorbing pipe having a pipe-shaped body coupled to the side periphery of the U-shaped cooling pipe and a vibration absorbing material filled in the body, wherein after the U-shaped cooling pipe is filled with a removable support material and the vibration absorbing pipes are filled with the vibration absorbing material, the U-shaped cooling pipe and the vibration absorbing pipes are located in a housing body injection mold in such a manner as to allow the U-shaped cooling pipe and the vibration absorbing pipes to be supported against a jig body made by dividing a portion of the housing body and to allow the housing body to be molded by means of insert injection molding, and after molding, the support material filled in the U-shaped cooling pipe is removed to provide the housing body where the U-shaped cooling pipe and the vibration absorbing pipes are buried in form of hollow portions, so that the motor becomes cool through circulation of the cooling fluid along the U-shaped cooling pipe.

To accomplish the above-mentioned objects, according to still yet another aspect of the present invention, there is provided a motor housing cooling device built as a power source motor housing of an electric vehicle in such a manner as to be used as a motor cooling device for the electric vehicle.

BRIEF DESCRIPTION OF THE DRAWINGS

The above and other objects, features and advantages of the present invention will be apparent from the following detailed description of the embodiments of the invention in conjunction with the accompanying drawings, in which.

DETAILED DESCRIPTION OF THE EMBODIMENTS

Figure 1:
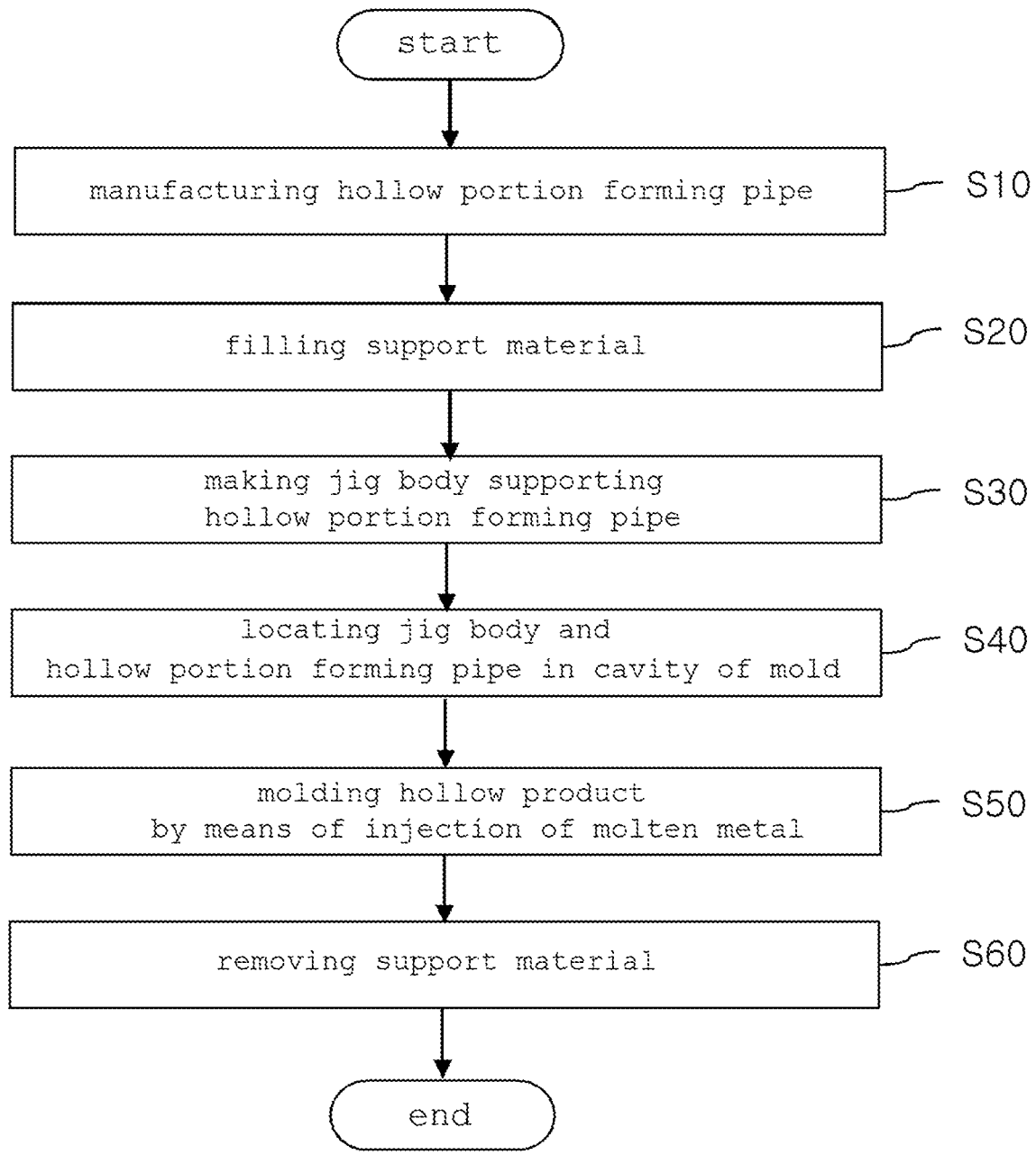
FIG. 1 is a flowchart showing a method for manufacturing a hollow product according to the present invention.

Hereinafter, the present invention will be in detail explained with reference to the attached drawings. Objects, characteristics and advantages of the present invention will be more clearly understood from the detailed description as will be described below and the attached drawings. The corresponding parts in the embodiments of the present invention are indicated by corresponding reference numerals and the repeated explanation on the corresponding parts will be avoided. If it is determined that the detailed explanation on the well known technology related to the present invention makes the scope of the present invention not clear, the explanation will be avoided for the brevity of the description.

Terms, such as the first, the second, A, B, (a), and (b) may be used to describe various elements, but the elements should not be restricted by the terms. The terms are used to only distinguish one element from the other element. When it is said that one element is described as being "connected" or "coupled" to the other element, one element may be directly connected or coupled to the other element, but it should be understood that another element may be present between the two elements.

FIG. 1 is a flowchart showing a method for manufacturing a hollow product according to the present invention.

As shown in FIG. 1, the method for manufacturing a hollow product according to the present invention includes the steps of: making a pipe having a diameter corresponding to a hollow portion of the hollow product, allowing the pipe to be formed to correspond to a hollow shape of the hollow product, and manufacturing the formed pipe as a hollow portion forming pipe 10 (Step S10); filling the inside of the hollow portion forming pipe 10 with a support material 20 so as to allow the hollow portion forming pipe 10 to be resistant with a pressure of a molten metal upon molding of the hollow product (Step S20); manufacturing a jig body 100 for supporting and fixing the hollow portion forming pipe 10 to a cavity 4C of a mold 4 for the hollow product (Step S30); coupling the hollow portion forming pipe 10 to the jig body 100 in the cavity 4C of the mold 4 for the hollow product (Step S40); and inserting the molten metal having the same material as the jig body 100 into the cavity 4C to mold the hollow product 8 unitary with the jig body 100 in such a manner as to surround the hollow portion forming pipe 10 (Step S50).

Further, the method for manufacturing a hollow product according to the present invention includes the step of removing the support material 20 filled in the hollow portion forming pipe 10 from the hollow portion forming pipe 10 after the hollow product 8 has been molded (Step S60).

According to the present invention, the step (S10) of manufacturing the hollow portion forming pipe 10 can be carried out with a plurality of examples.

For example, a metal pipe having an inner diameter corresponding to a hollow portion of the hollow product is made, and the single metal pipe is formed to the shape corresponding to a hollow shape of the hollow product, thereby manufacturing the hollow portion forming pipe 10. Otherwise, metal pipes are made and cut to a designed length, and after that, the metal pipes are bent and formed so that the bent pipes and the linear pipes are connected to manufacture the hollow portion forming pipe 10 like the hollow shape of the hollow product. So as to manufacture the hollow portion forming pipe 10, in detail, one pipe is bent according to the hollow shape of the hollow product or a plurality of pipes is bent and formed so that the bent pipes and the linear pipes are connected with each other.

Figure 2:
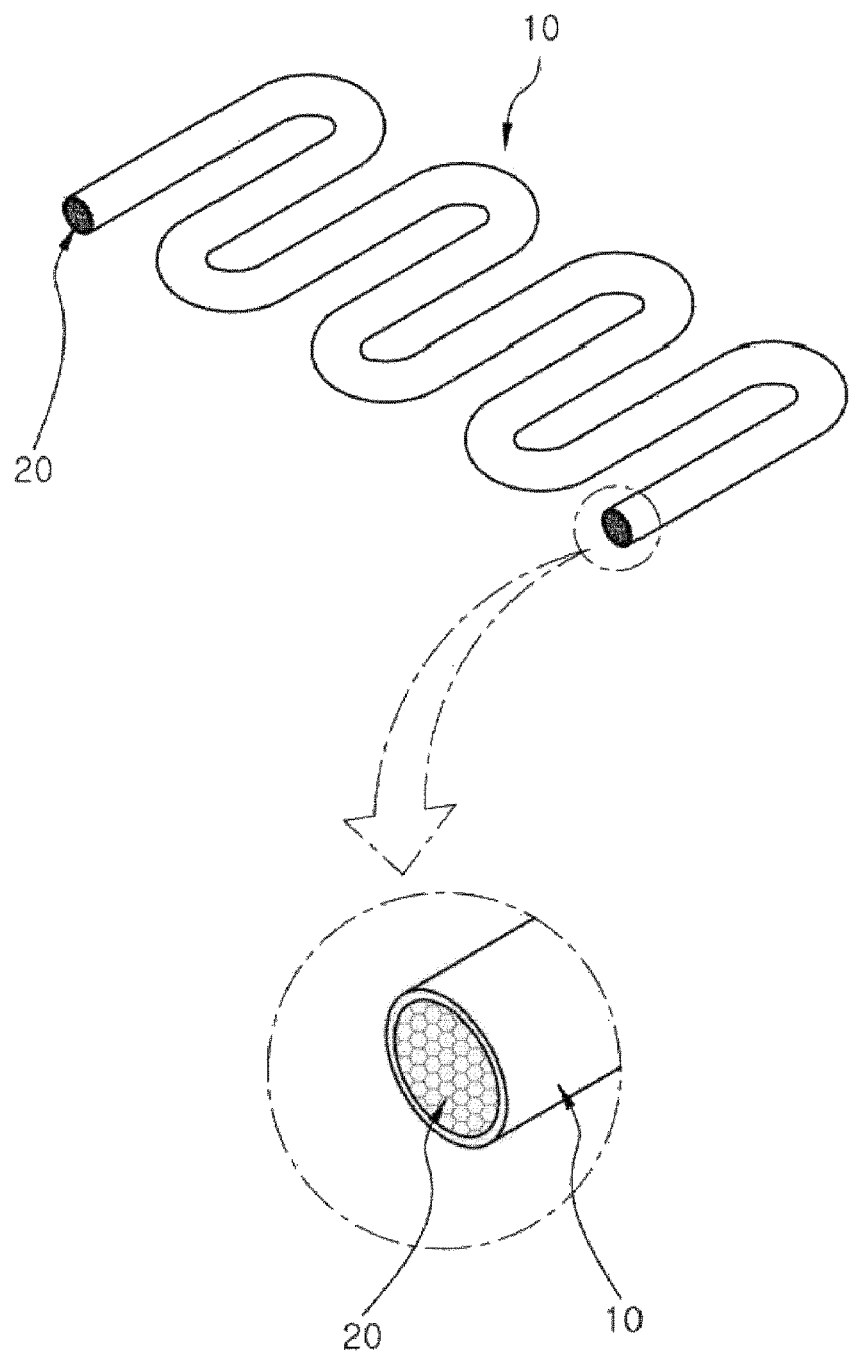
FIG. 2 is a perspective view showing an example of a hollow portion forming pipe adopted in the method for manufacturing a hollow product according to the present invention.
Figure 3:
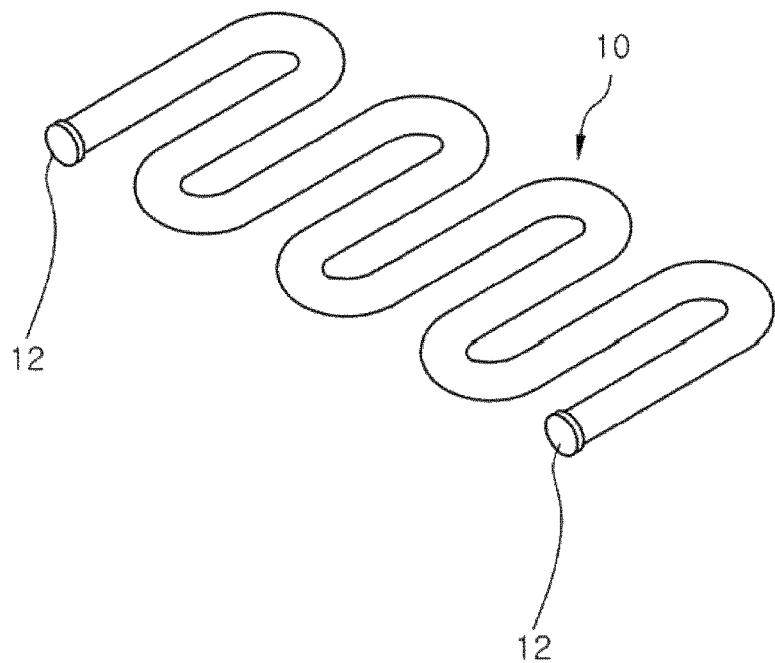
FIG. 3 is a perspective view showing a state where inlets of the hollow portion forming pipe of FIG.2 are covered with caps after the hollow portion forming pipe is filled with a support material in the method for manufacturing a hollow product according to the present invention.

FIG. 2 is a perspective view showing an example of the hollow portion forming pipe adopted in the method for manufacturing a hollow product according to the present invention, and FIG. 3 is a perspective view showing a state where inlets of the hollow portion forming pipe of FIG. 2 are covered with caps after the hollow portion forming pipe is filled with a support material in the method for manufacturing a hollow product according to the present invention.

After the hollow portion forming pipe 10 having the shape corresponding to the hollow shape of the hollow product 8 has been manufactured, the step of (S20) filling the inside of the hollow portion forming pipe 10 with the support material 20 is carried out so as to allow the hollow portion forming pipe 10 to be resistant with the pressure of the molten metal upon molding of the hollow product.

In detail, the step of (S20) filling the inside of the hollow portion forming pipe 10 with the support material 20 is carried out so as to prevent the hollow portion forming pipe 10 from being deformed when the molten metal is pressurizedly injected so as to mold the hollow product.

The support material 20 filled in the interior of the hollow portion forming pipe 10 is a water soluble material. In this case, if water is poured into the hollow portion forming pipe 10 after the hollow product has been molded, the support material 20 filled in the interior of the hollow portion forming pipe 10 is soluble in the water to make the hollow portion forming pipe 10 empty, and the hollow portion forming pipe 10 from which the support material 20 disappears is buried in the hollow product, so that the hollow product having the hollow portion formed therein can be molded.

For example, the water soluble support material 20 is made of salt. If water is poured into the hollow portion forming pipe 10, in this case, salt is melted and thus removed. At this time, if the hollow portion forming pipe 10 is made of aluminum and the molten metal is a high temperature aluminum molten material, a molten temperature of salt is higher than that of aluminum so that a portion of a surface of the hollow portion forming pipe 10 becomes molten and molded unitarily with the molten metal, and contrarily, salt, heat-resistant powder or grains, or heat-resistant fibers are still kept in shape, thereby allowing the hollow portion forming pipe 10 to be resistant with the pressure of the molten metal.

For example, the support material 20 includes at least one selected from the group consisting of a water soluble filler, non-organic grains or powder, heat-resistant grains or powder, and heat-resistant fibers, and the heat resistance means that no heat deformation or dissolution occurs at a temperature of greater than 650° C.

The hollow portion forming pipe 10 can be prevented from being deformed due to the injection pressure of the molten metal. In a state where the hollow portion forming pipe 10 is supported against salt, heat-resistant powder or grains, or heat-resistant fibers, the hollow portion forming pipe 10 can be formed unitarily with the molten metal, and simultaneously, the hollow product having the hollow portion formed therein can be molded by means of the hollow portion forming pipe 10.

After the hollow portion forming pipe 10 has been filled with the support material 20, caps 12 are coupled to both ends of the hollow portion forming pipe 10 to prevent the filled support material 20 from leaking to the outside. As a result, the support material 20 can be prevented from leaking due to application of a pressure to the hollow portion forming pipe 10 when the molten metal is injected to perform the molding.

Figure 4:
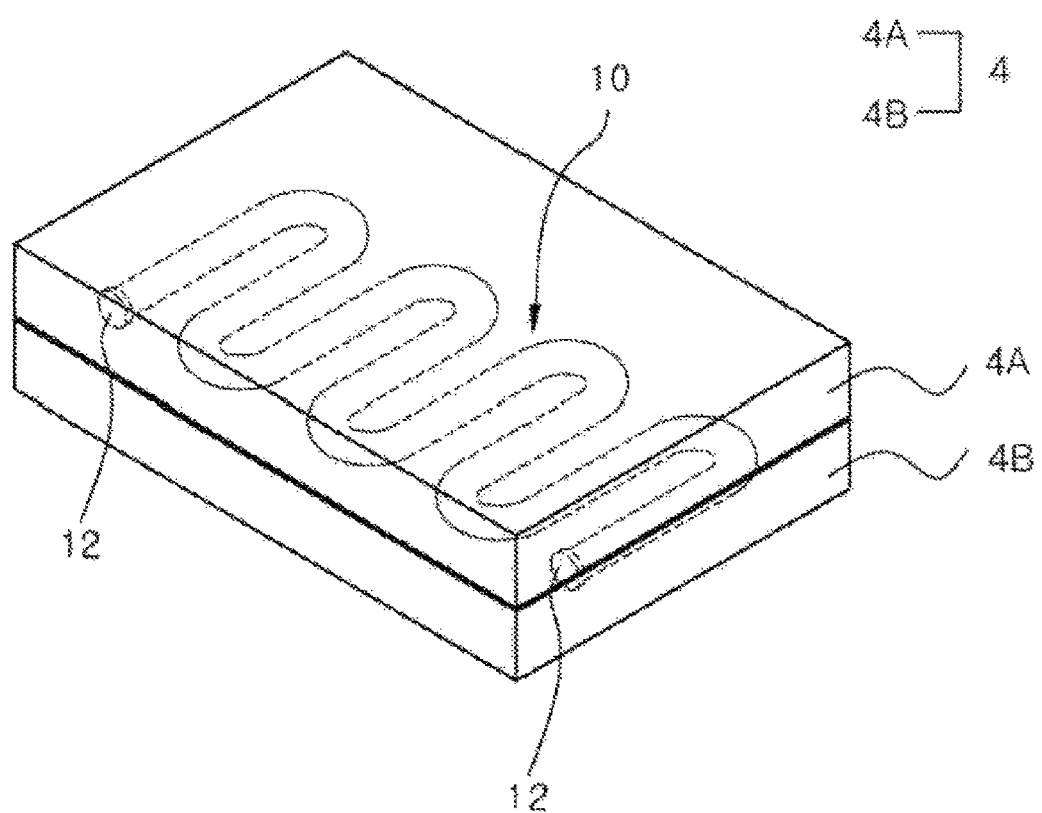
FIG. 4 is a perspective view showing a state where the hollow portion forming pipe of FIG. 3 is inserted into a cavity of a mold in the method for manufacturing a hollow product according to the present invention.
Figure 5:
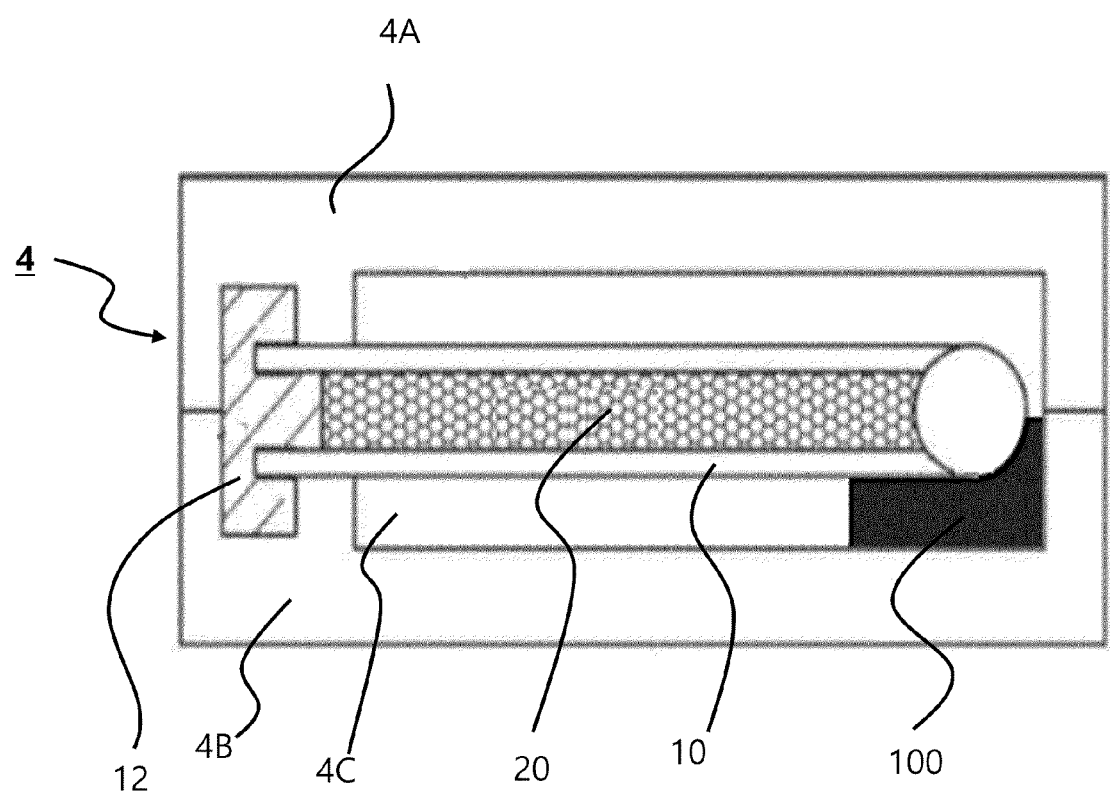
FIG. 5 is a side sectional view showing a state where the hollow portion forming pipe of FIG. 4 inserted into the cavity of the mold is supported against a jig body in the method for manufacturing a hollow product according to the present invention.

FIG. 4 is a perspective view showing a state where the hollow portion forming pipe of FIG. 3 is inserted into a cavity of a mold in the method for manufacturing a hollow product according to the present invention, and FIG. 5 is a side sectional view of FIG. 4.

After the hollow portion forming pipe 10 is formed to correspond to the hollow shape of the hollow product and is then filled with the support material 20, as shown in FIGS. 4 and 5, the hollow portion forming pipe 10 is inserted into the cavity 4C of the mold 4, and the molten metal is injected to mold the hollow product. If the molten metal is injected into the cavity 4C, in detail, the molten metal surrounds the hollow portion forming pipe 10 so that it is a unitary body with the hollow portion forming pipe 10, thereby allowing the hollow product to be molded.

At the time when the hollow portion forming pipe 10 is inserted into the cavity 4C of the mold 4, both ends of the hollow portion forming pipe 10 are drawn to the outside from the cavity 4C and then fixed by means of the mold 4. In a state where the hollow portion forming pipe 10 does not have any support means in the space of the cavity 4C, however, both inlet ends of the hollow portion forming pipe 10 are fixed only by means of the mold 4. If the molten metal is pressurized injected, accordingly, the hollow portion forming pipe 10 floating in the space may be deviated from its position by means of the molten metal injected, and the formed shape of the hollow portion forming pipe may be changed.

FIG. 5 is a side sectional view showing a state where the hollow portion forming pipe of FIG. 4 inserted into the cavity of the mold is supported against a jig body.

The step (S30) of manufacturing a jig body 100 for supporting and fixing the hollow portion forming pipe 10 into the cavity 4C of the mold 4 for the hollow product is carried out by pre-fabricating a portion of a body of the hollow product that is made of the same material as the body of the hollow product.

The hollow portion forming pipe 10 is located inside the body of the hollow product, and accordingly, it floats in the space of the cavity 4C, so that a jig cannot be additionally mounted thereon. According to the present invention, therefore, the jig body 100, which is capable of supporting the hollow portion forming pipe 10 against the cavity 4C and being formed unitarily with the body of the hollow product after the molding, is manufactured as the jig. A portion of the body of the hollow product is prefabricated as the jig body 100.

The jig body 100 is simply configured to support the hollow portion forming pipe 10 in the space of the cavity 4C, to become any one of an inner body and an outer body divided around the hollow portion forming pipe 10, or to have a plurality of jig bodies made by allowing the hollow product body except the hollow portion to be divided into a plurality of pieces. This can be designed to prevent the deformation of the hollow portion forming pipe 10 and also to fix the position of the hollow portion forming pipe 10 in consideration of the shape or size of the hollow portion forming pipe 10. If the jig body is made of an extruded material, further, the jig body made of the extruded material is coupled to a stator after the hollow product body has been molded. At this time, the interior of the jig body is precisely machined to an accurate size capable of being coupled to the stator.

Next, the step (S40) of coupling the hollow portion forming pipe 10 to the jig body 100 in the cavity 4C of the mold 4 for the hollow product is carried out.

Like this, a portion of the body of the hollow product is prefabricated as the jig body 100, and the hollow body 10 is coupled to the jig body 100 and is then located in the cavity 4C as shown in FIG. 5. In detail, the hollow portion forming pipe 10 is supportedly coupled to the prefabricated jig body 100 in the space of the cavity 4C and is thus located in the cavity 4C.

As shown in FIGS. 4 and 5, the step (S50) of injecting the molten metal having the same material as the jig body 100 into the cavity 4C to mold the hollow product 8 unitary with the jig body 100 in such a manner as to surround the hollow portion forming pipe 10 is carried out by injecting the molten metal into the cavity 4C after the jig body 100 and the hollow portion forming pipe 10 have been located in the cavity 4C.

At this time, the jig body 100 is made of the same material as the molten metal, and if the molten metal is injected into the cavity 4C, the jig body 100 is unitary with the molten metal to form a single body and surrounds the hollow portion forming pipe 10. Of course, if the hollow portion forming pipe 10 is made of the same material as the molten metal, the surface of the hollow portion forming pipe 10 is molten and thus unitary with the body of the hollow product.

Otherwise, the jig body 100 is made of a different material from the molten metal according to the characteristics of the hollow product, so that the jig body 100 may be made of a material having different strength from a material of the remaining body portion. In detail, if a portion of the hollow product body as the jig body 100 is made of a metal and a liquid plastic material instead of the molten metal is injected, the jig body and the remaining portion can be made of the materials different from each other. Such a configuration having different materials can be applied to a product for a specific purpose.

Figure 6:
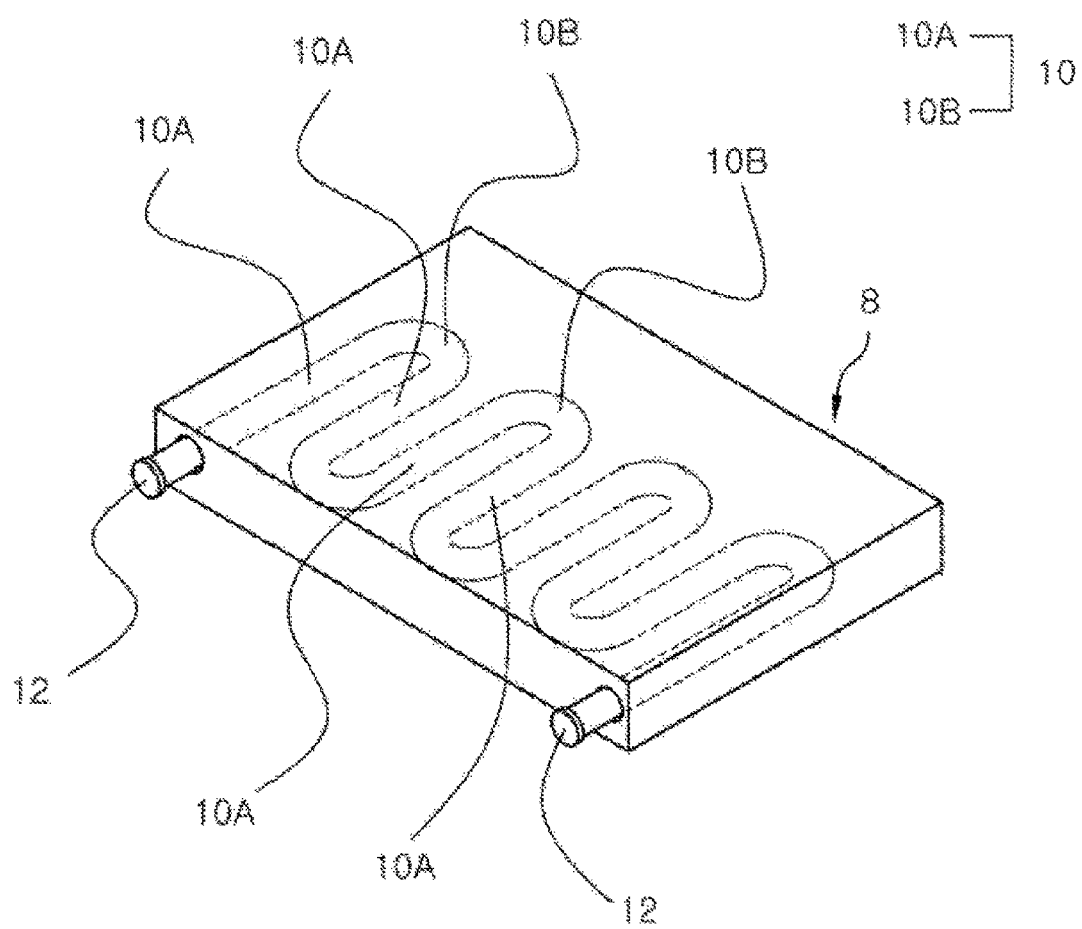
FIG. 6 is a perspective view showing an example of the hollow product molded through the method for manufacturing a hollow product according to the present invention.

FIG. 6 is a perspective view showing an example of the hollow product molded through the method for manufacturing a hollow product according to the present invention.

The hollow product can be manufactured as a hollow product having the hollow portion forming pipe filled with the support material through a finishing process of the inlets of the hollow portion forming pipe 10 drawn from the cavity 4C from the outside after the molding, and otherwise, the hollow product can be manufactured as a hollow product having the hollow portion forming pipe whose interior is empty through the removal of the support material.

The hollow product having the hollow portion forming pipe filled with the support material, like a wheel assembly, is made by in advance filling the hollow portion forming pipe 10 of the hollow product with a vibration isolation material or a sound absorbing material.

So as to allow the vibration isolation material or sound absorbing material to be additionally filled in the hollow portion forming pipe after the hollow product has been molded, the support material is first filled in the hollow portion forming pipe to prevent the hollow portion forming pipe from being deformed upon the injection of the molten metal, and after the support material is removed, the vibration isolation material or sound absorbing material has to be filled in the hollow portion of the hollow product, which makes the workability deteriorated. According to the present invention, therefore, the vibration isolation material or sound absorbing material as the support material 20 is filled in the hollow portion forming pipe 10, and the hollow product is molded in the filled state. In this case, the hollow portion forming pipe 10 may be made of the same as or different material from the hollow product.

On the other hand, the hollow product having the hollow portion forming pipe whose inside is empty is made as a hollow product using the hollow portion forming pipe as a pipe along which a fluid like cooling water flows, and to do this, the support material 20 filled in the hollow portion forming pipe 10 has to be removed. The hollow product may have a simple linear hollow shape, but it may have a long hollow shape with curves. In this case, the removal of the support material 20 from the hollow portion forming pipe 10 requires a lot of time, and also, it is hard to perfectly remove the support material. Accordingly, it is effective to use the support material 20 that is soluble in water (a solution capable of melting the support material).

In detail, salt as the support material 20 is filled in the hollow portion forming pipe 10 to support the hollow portion forming pipe 10, and after the hollow product has been molded, water melts the salt to remove the support material 20 from the hollow portion forming pipe 10.

After the hollow product has been molded by means of the injection of the molten metal in the state where the hollow portion forming pipe 10 is supported against the salt, the caps 12 coupled to the inlets of the hollow portion forming pipe 10 are removed, and next, if water is injected into the hollow portion forming pipe 10 to melt the salt, the salt can be removed from the interior of the hollow portion forming pipe 10.

After the hollow product 8 has been molded through the method according to the present invention, further, a method as will be described below is carried out to effectively remove the soluble material remaining in the interior of the hollow portion forming pipe 10 buried in the hollow product 8.

In the state where the hollow portion forming pipe 10 is inserted into the cavity 4C of the mold 4 after the salt is filled in the interior of the hollow portion forming pipe 10, the molten metal is injected into the cavity 4C of the mold 4 at a given pressure to mold a preliminary hollow product 8 made with the molten metal unitary with the hollow portion forming pipe 10. At this time, the mold 4 is constituted of an upper mold 4A and a lower mold 4B, and in a state where the upper mold 4A and the lower mold 4B are coupled to each other, the cavity 4C for molding the hollow product 8 is formed inside the mold 4.

In the state where the hollow portion forming pipe 10 is inserted into the cavity 4C of the mold 4 for forming the hollow product 8 after the salt has been filled in the interior of the hollow portion forming pipe 10, in detail, the molten metal is injected into the cavity 4C of the mold 4 to form an outer appearance of the hollow product 8. Next, if water is injected into the hollow portion forming pipe 10 at a given pressure, the salt is melted in the injected water and is thus removed, and if the salt is removed, the hollow portion forming pipe 10 is buried in the hollow product 8 so that the hollow product 8 having the hollow portion formed therein can be molded by means of the empty hollow portion forming pipe 10.

According to another example of the present invention, the support material 20 may be made of a particulate material having strength allowing the hollow portion forming pipe 10 to be resistant with the pressure of the molten metal injected, and after the hollow portion is formed in the interior of the hollow product by means of the hollow portion forming pipe 10, the support material 20 can be removed from the hollow portion forming pipe 10. At this time, the particulate material such as ceramic, sand, and balls (metal balls, that is, steel balls) is made of a material having a melting temperature higher than a high temperature of the molten metal and a melting temperature of the hollow portion forming pipe 10.

If the hollow portion forming pipe 10 is made of aluminum and the molten metal is a high temperature aluminum molten material, as mentioned above, a melting temperature of the particulate support material 20 made of ceramic or steel balls is higher than that of aluminum so that a portion of the hollow portion forming pipe 10 becomes molten and molded unitarily with the molten metal, and contrarily, the particulate support material 20 is still kept in shape, thereby allowing the hollow portion forming pipe 10 to be resistant with the pressure of the molten metal injected. The hollow portion forming pipe 10 can be prevented from being deformed due to the injection pressure of the molten metal. In a state where the hollow portion forming pipe 10 is supported against the particulate support material 20, the hollow portion forming pipe 10 can be formed unitarily with the molten metal, and simultaneously, the hollow product having the hollow portion formed therein can be molded by means of the hollow portion forming pipe 10.

In the state where the hollow portion forming pipe 10 is supported against the particulate support material 20, the molten metal is injected to mold the hollow product, and next, the caps 12 coupled to the inlets of the hollow portion forming pipe 10 are removed to remove the particulate support material 20 from the interior of the hollow portion forming pipe 10. If necessary, pressure water is injected into the hollow portion forming pipe 10 at a given pressure, and through the pressure of water injected, the particulate support material 20 can be removed from the hollow portion forming pipe 10.

On the other hand, the mold 4 is configured to have the upper mold 4A and the lower mold 4B coupled to each other, and so as to allow the caps 12 coupled to the hollow portion forming pipe 10 to be located at the outside of the cavity 4C of the mold 4, half cap grooves are formed on the upper mold 4A and the lower mold 4B. As a result, the half cap grooves face each other to form a cap groove, and after only the hollow portion forming pipe 10 is inserted into the cavity 4C of the mold 4 in a state each cap 12 is accommodated in the cap groove, the molten metal is injected into the cavity 4C of the mold 4, thereby molding the hollow product.

As the caps 12 are exposed to the outside of the hollow product, accordingly, they can be removed from the hollow portion forming pipe 10. If salt is filled in the interior of the hollow portion forming pipe 10 after the caps 12 have been removed from the hollow portion forming pipe 10, water is injected to meltedly remove the salt, and contrarily, if the particulate support material like ceramic, steel balls, and so on is filled in the interior of the hollow portion forming pipe 10, the caps 12 are removed to allow the particulate support material to be drawn from the hollow portion forming pipe 10.

At this time, the hollow portion forming pipe 10 is made of the same metal as the molten metal, and after the hollow portion forming pipe 10 has been molded unitarily with the hollow product 8, the support material 20 is removed from the hollow portion forming pipe 10. As mentioned above, the hollow portion forming pipe 10 and the molten metal may be made of aluminum.

According to the present invention, the hollow portion forming pipe 10 is molded to a continuous loop type pipe allowing one side end portion thereof to become an inlet portion and allowing the other side end portion thereof to become an outlet portion, so that the hollow portion of the hollow product is continuously connected to form a single path.

As shown in FIG. 6, that is, the hollow portion of the hollow product 8 is constituted of a plurality of hollow portions 10A parallel with each other and a plurality of hollow portions (curved hollow portions) 10B connecting the plurality of hollow portions 10A with each other.

The hollow portion forming pipe 10 is molded to the loop type hollow portion forming pipe 10 continuously connected to the form of zigzag, so that the loop type hollow portion can be formed continuously zigzagged.

If the hollow portion forming pipe 10 has a shape of a zigzagged pipe like a hot water pipe of a boiler that is buried in the floor, the hollow portion, which is made by connecting the plurality of hollow portions 10A parallel with each other and the plurality of hollow portions 10B connecting the plurality of hollow portions 10A with each other, can be formed in the hollow product 8.

At this time, the hollow portion forming pipe 10 adopted in the present invention is formed of the zigzagged coil type pipe, but in addition thereto, only if the hollow portion forming pipe 10 like a straight type pipe 10 is capable of forming the hollow portion in the hollow product 8, it may be freely used.

On the other hand, the hollow product 8 molded according to the present invention may be adopted as a cooling plate located between battery packs of a rechargeable battery, and in this case, cooling water s circulated along the hollow portion of the hollow product 8 to allow the battery packs of the rechargeable battery to become cool.

In addition to the cooling plate, of course, the hollow product 8 molded according to the present invention may be adopted as various hollow products.

A cooling device according to the present invention can be manufactured through the method as explained with reference to FIGS. 3 to 6.

For example, a method for manufacturing a cooling device for circulating a cooling fluid through a cooling pipe according to the present invention includes the steps of: manufacturing the cooling pipe and forming the cooling pipe to a shape to be buried in a housing body; filling the inside of the form ed cooling pipe with a support material; manufacturing a portion, which is formed by dividing the housing body, as a jig body so as to support the cooling pipe inside a housing body injection mold; locating the cooling pipe inside the housing body injection mold to allow the cooling pipe to be supported by jig body and injection-molding the housing body; and removing the support material filled inside the cooling pipe after molding.

In this case, the cooling pipe is a helix cooling pipe formed by winding a single pipe helixly with respect to the housing body or a U-shaped cooling pipe formed by bending a single pipe in form of zigzag to have a circular shape in a plane direction.

One or a plurality of jig bodies may be provided, and if the plurality of jig bodies are provided, they have widths whose portions smaller than their original body widths, so that their facing portions have sufficient gaps therebetween.

Further, the jig body has a plurality of injection grooves formed on the surface thereof to allow a liquid material of the housing body to be injected thereinto.

The support material is a water soluble material, and after the housing body has been molded, water is injected into the cooling pipe to melt the support material, so that the support material is removed from the cooling pipe.

The cooling pipe is coupled to a vibration absorbing pipe, and a vibration absorbing material as a support material is filled in the vibration absorbing pipe. Next, the vibration absorbing pipe is buried in the housing body, together with the cooling pipe, through the injection molding of the housing body. After that, the support material inside the cooling pipe is removed, and the vibration absorbing material inside the vibration absorbing pipe is not removed.

Otherwise, the support material is filled in the vibration absorbing material as well as the cooling pipe, and next, the vibration absorbing pipe is buried in the housing body, together with the cooling pipe, through the injection molding of the housing body. After that, the support material inside the cooling pipe and the vibration absorbing pipe is removed, and a vibration absorbing material is filled in the vibration absorbing pipe.

The cooling device is configured to allow the cooling pipe to be buried in the housing body having an accommodation space formed therein to locate the motor therein, to allow the cooling fluid to be circulated through the cooling pipe, and to allow the motor to be cool.

Hereinafter, an explanation on a motor housing cooling device according to the present invention and a method for manufacturing a motor housing cooling device according to the present invention will be in detail given with reference to FIGS. 7 to 32.

Figure 7:
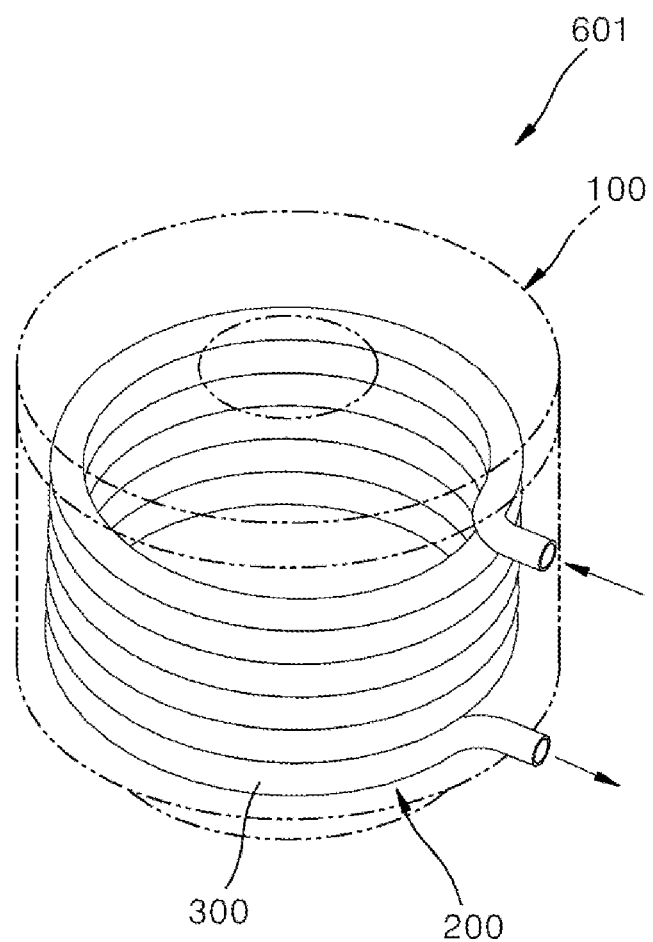
FIG. 7 is a perspective view showing a motor housing cooling device according to a first embodiment of the present invention.
Figure 8:
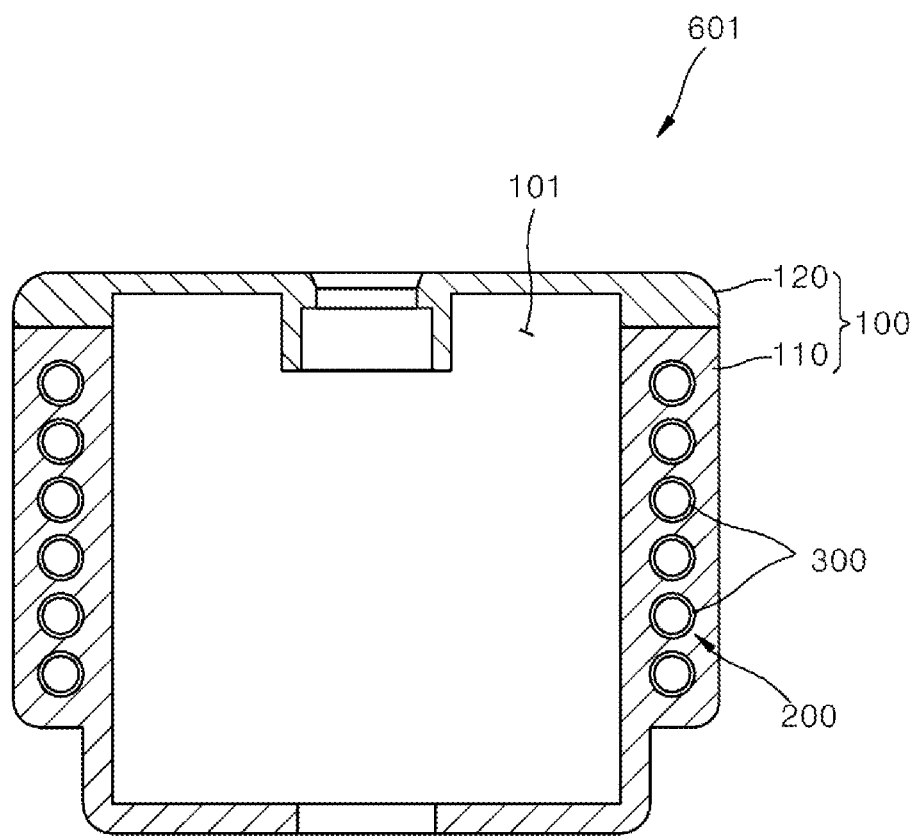
FIG. 8 is a sectional view showing the motor housing cooling device of FIG. 7.

As shown in FIGS. 7 and 8, a motor housing cooling device 601 according to a first embodiment of the present invention largely includes a motor housing 100 and a cooling pipe 200.

The motor housing 100 includes a housing body 110 and a cover 120. Further, the housing body 110 having a shape of a cylinder includes an accommodation space 101 formed therein to accommodate a motor (not shown) therein. The cover 120 is connected to the housing body 110 in such a manner as to close the housing body 110. In the figures, the motor housing 100 has the housing body 110 whose top is open, like a cup and the cover 120 coupled to the open top of the housing body 110, but of course, the motor housing 100 may be freely varied in structure and shape.

The cooling pipe 200 is buried in the housing body 110 and serves to cool the interior of the accommodation space 101 through a cooling fluid moving therealong. So as to enhance the cooling efficiency for the motor, desirably, the cooling pipe 200 is located in a circumferential direction along the outer peripheral surface of the housing body 110. The cooling pipe 200 is buried in a mold for making the motor housing 100 by means of insert injection molding.

On the other hand, even if not shown, the motor housing cooling device 601 further includes a pump connected to the cooling pipe 200 to forcedly move the cooling fluid, and the pump is controlled by means of a controller, so that through the control of the pump, a flow rate of the cooling fluid can be adjusted in consideration of the characteristics and cooling performance of the cooling fluid. In this case, of course, the controller controls the pump according to set values or a temperature of the cooling fluid sensed by means of a temperature sensor for sensing the temperature of the cooling fluid, thereby controlling the flow rate of the cooling fluid.

Hereinafter, first, the cooling pipe 200, that is, a helix cooling pipe 300 will be explained.

The helix cooling pipe 300 as the cooling pipe 200 is buried helixly inside the outer peripheral surface of the housing body 110 in a circumferential direction of the housing body 110. The helix cooling pipe 300 is wound inside the outer peripheral surface of the housing body 110 in the circumferential direction of the housing body 110 in such a manner as to be laid onto each other at given intervals in a height direction of the housing body 110.

As shown, the helix cooling pipe 300 is configured to allow the cooling fluid to be introduced into an upper end portion thereof and to be discharged to a lower end portion thereof.

In this case, cooling water, refrigerant, and air as well known may be used as the cooling fluid, and a variety of fluids may be used as the cooling fluid only if they accomplish their cooling purpose. Desirably, cooling water, which is easy to be handled and has good cooling efficiency and fluidity, can be used as the cooling fluid.

The helix cooling pipe 300 is configured to allow a sectional shape of the cooling fluid flowing therethrough to become circular, and otherwise, it is configured to allow a sectional shape of the cooling fluid flowing therethrough to become rectangular as will be discussed later.

Figure 9:
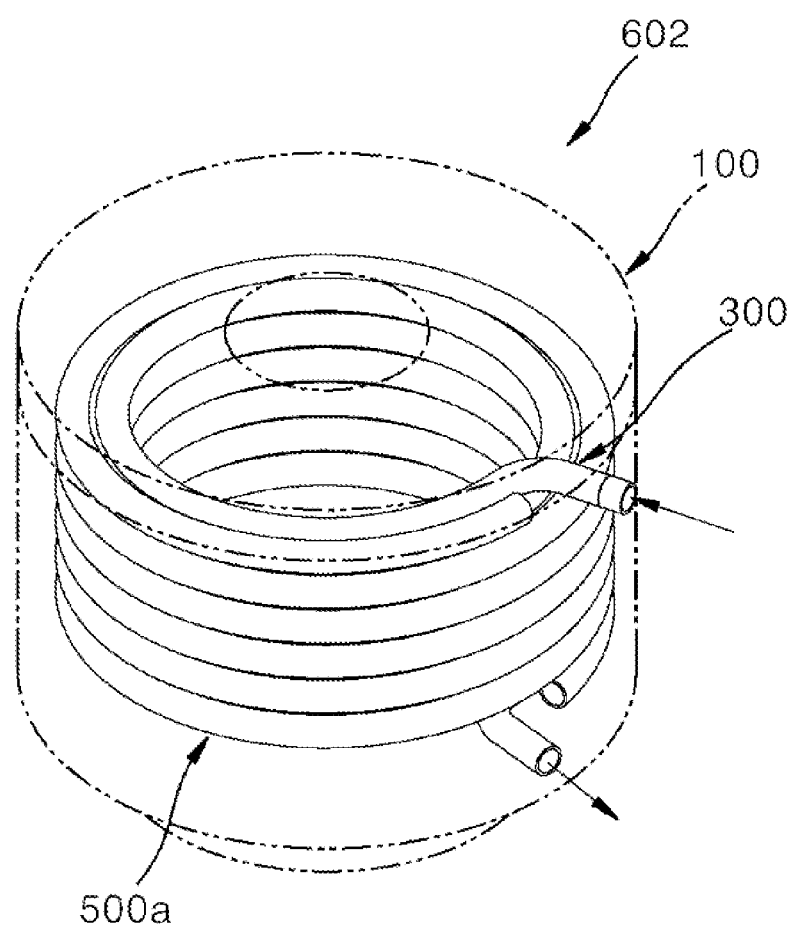
FIG. 9 is a perspective view showing another example of a cooling pipe in the motor housing cooling device of FIG. 7.
Figure 10:
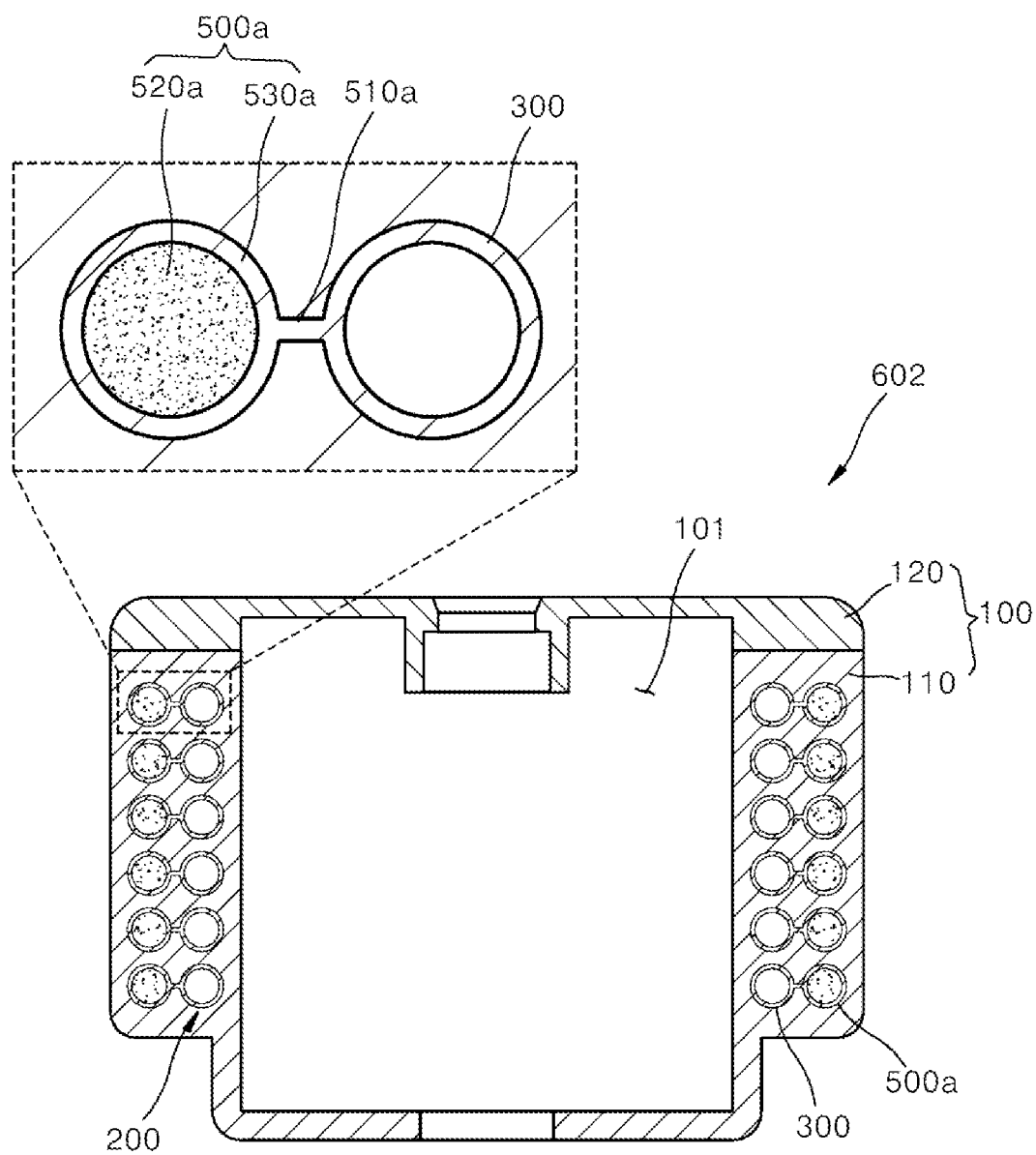
FIG. 10 is a longitudinal sectional view showing the motor housing cooling device of FIG. 9.

Referring to FIGS. 9 and 10, a motor housing cooling device 602 according to the present invention includes a vibration absorbing pipe 500a buried inside the housing body 110 to absorb vibrations. The vibration absorbing pipe 500a includes a pipe-shaped body 530a and a vibration absorbing material 520a filled in the body 520. In this case, the vibration absorbing material 520a is formed of a known absorbing material capable of absorbing vibrations, and therefore, a detailed explanation on the vibration absorbing material 520a will be avoided.

Figure 11:
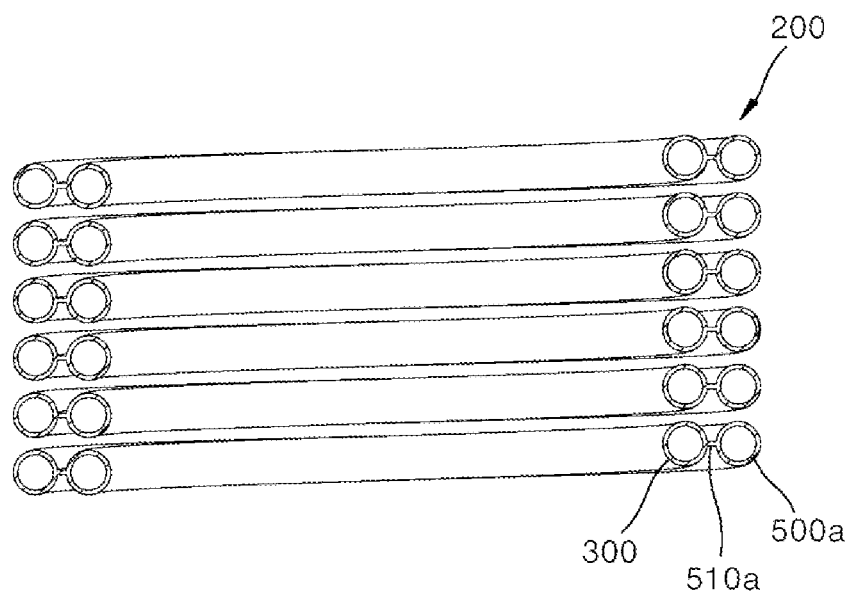
FIG. 11 is a longitudinal sectional view showing the cooling pipe and a vibration absorbing pipe of FIG. 9.

Referring to FIG. 11, the vibration absorbing pipe 500a is coupled to the side peripheral surface of the helix cooling pipe 300 in such a manner as to be spaced apart from the helix cooling pipe 300 by means of a coupling member 510. One end portion of the coupling member 510 is coupled to the side peripheral surface of the helix cooling pipe 300, and the other end portion thereof to the side peripheral surface of the vibration absorbing pipe 500a, so that the vibration absorbing pipe 500a is coupled to the helix cooling pipe 300 in such a manner as to be spaced apart from the side peripheral surface of the helix cooling pipe 300.

The vibration absorbing pipe 500a is coupled to the outer peripheral surface of the helix cooling pipe 300 in such a manner as to be helixly formed correspondingly to the helix cooling pipe 300 in the circumferential direction of the housing body 110. In the figures, at this time, the vibration absorbing pipe 500a is coupled to the outer peripheral surface of the helix cooling pipe 300 to allow the helix cooling pipe 300 to be located at the inside thereof, thereby improving the cooling efficiency. However, of course, the vibration absorbing pipe 500a may be freely coupled to various positions like the inner peripheral surface of the helix cooling pipe 300.

Figure 12:
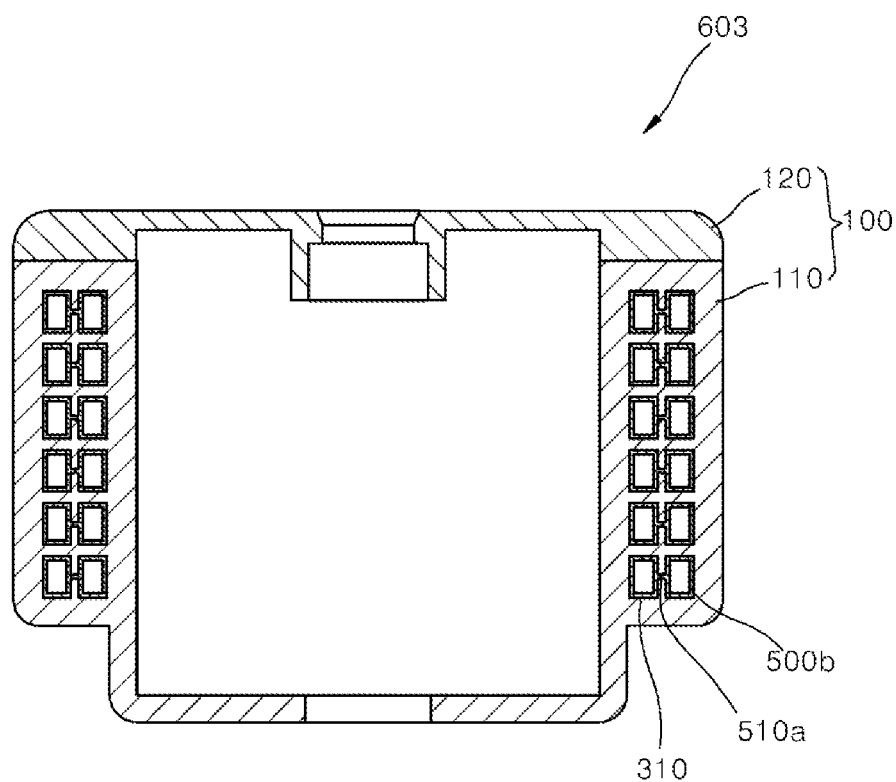
FIG. 12 is a perspective view showing another example of the cooling pipe and the vibration absorbing pipe of the motor housing cooling device of FIG. 9.

On the other hand, as shown in FIGS. 12 to 15, the vibration absorbing pipe 500a has a sectional shape of a circle or rectangle in a radial direction thereof. As shown in FIG. 12, the helix cooling pipe 300 located at the inner side (the right side in the figure) has a sectional shape of a rectangle, and the vibration absorbing pipe 500a located at the outer side (the left side in the figure) has a sectional shape of a rectangle.

Figure 13:
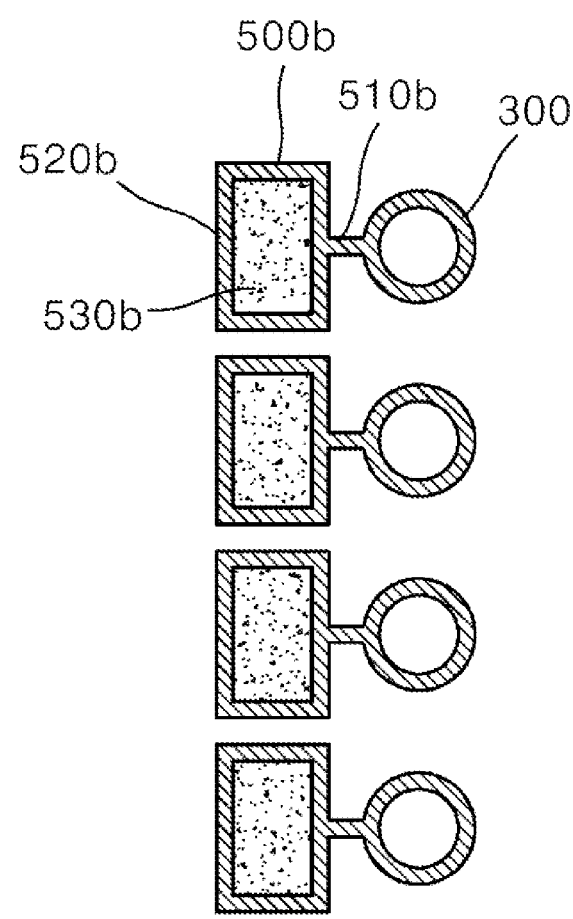
FIGS. 13 to 15 are perspective views showing other examples of the cooling pipe and the vibration absorbing pipe of the motor housing cooling device of FIG. 9.
Figure 14:
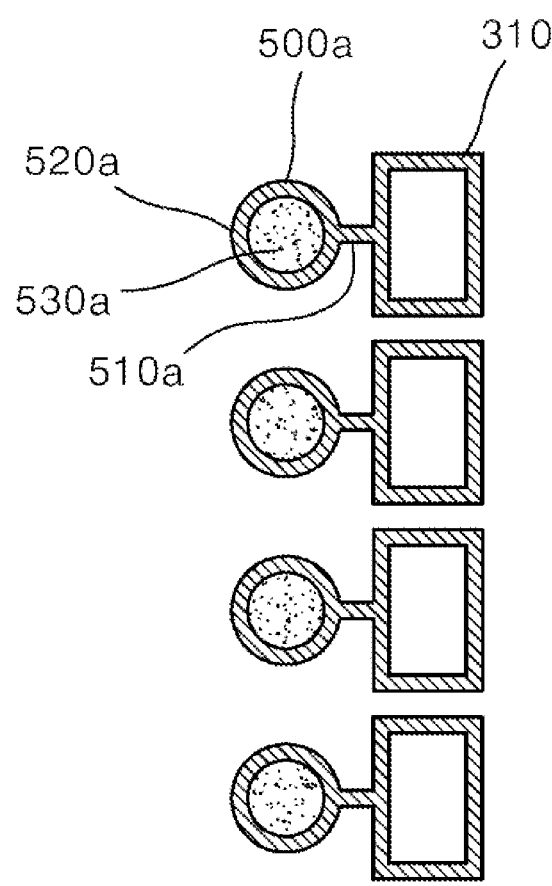

As shown in FIG. 13, further, the helix cooling pipe 300 located at the inner side has a sectional shape of a circle, and the vibration absorbing pipe 500a located at the outer side has a sectional shape of a rectangle. As shown in FIG. 14, further, the helix cooling pipe 300 located at the inner side has a sectional shape of a rectangle, and the vibration absorbing pipe 500a located at the outer side has a sectional shape of a circle. In this case, reference numerals 510b, 520b, and 530b as not explained yet indicate coupling members, bodies, and vibration absorbing materials.

Figure 15:
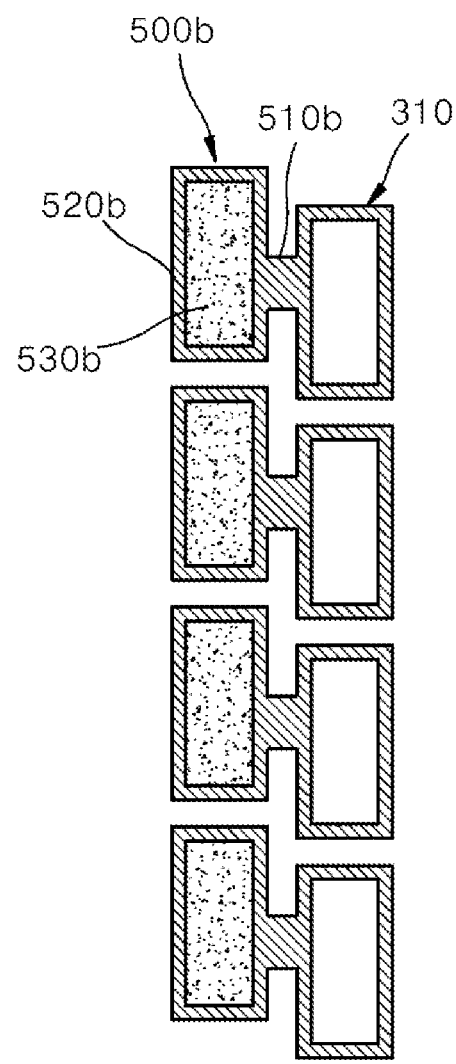

In this case, the helix cooling pipe 300 and the vibration absorbing pipe 500a are aligned to each other with respect to the radial direction of the housing body 110. As shown in FIG. 15, further, the helix cooling pipe 300 and the vibration absorbing pipe 500a are misaligned to each other with respect to the radial direction of the housing body 110.

Figure 16:
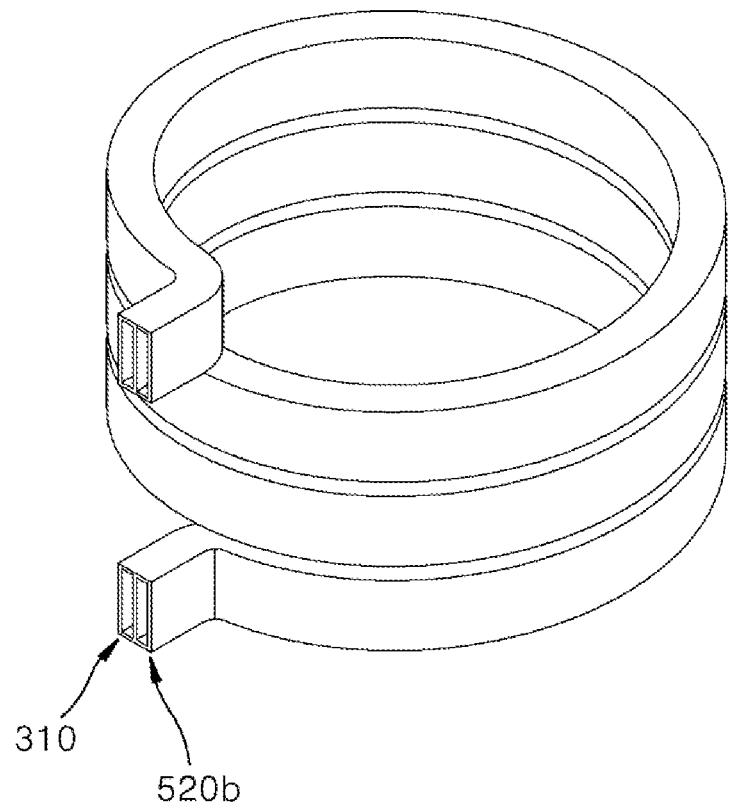
FIG. 16 is a perspective view showing yet another example of the cooling pipe in the motor housing cooling device of FIG. 7.
Figure 17:
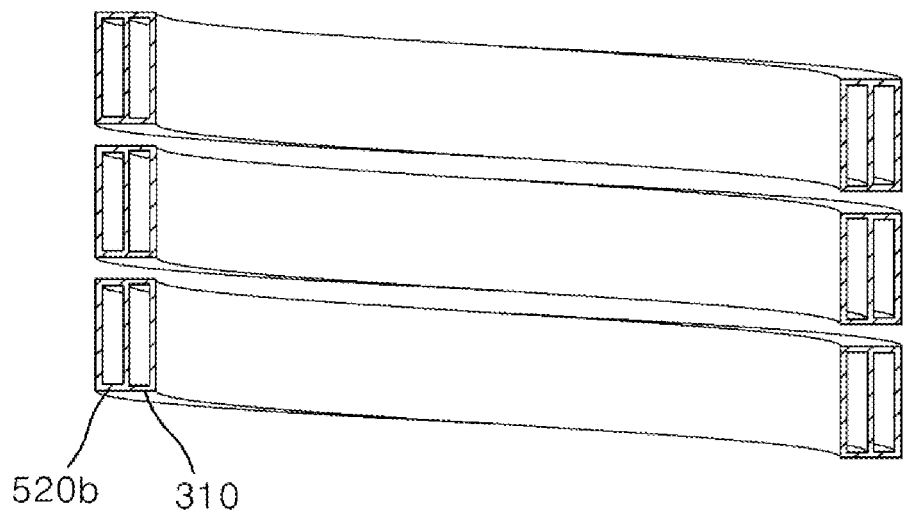
FIG. 17 is a longitudinal sectional view showing the cooling pipe of FIG. 16.
Figure 18:
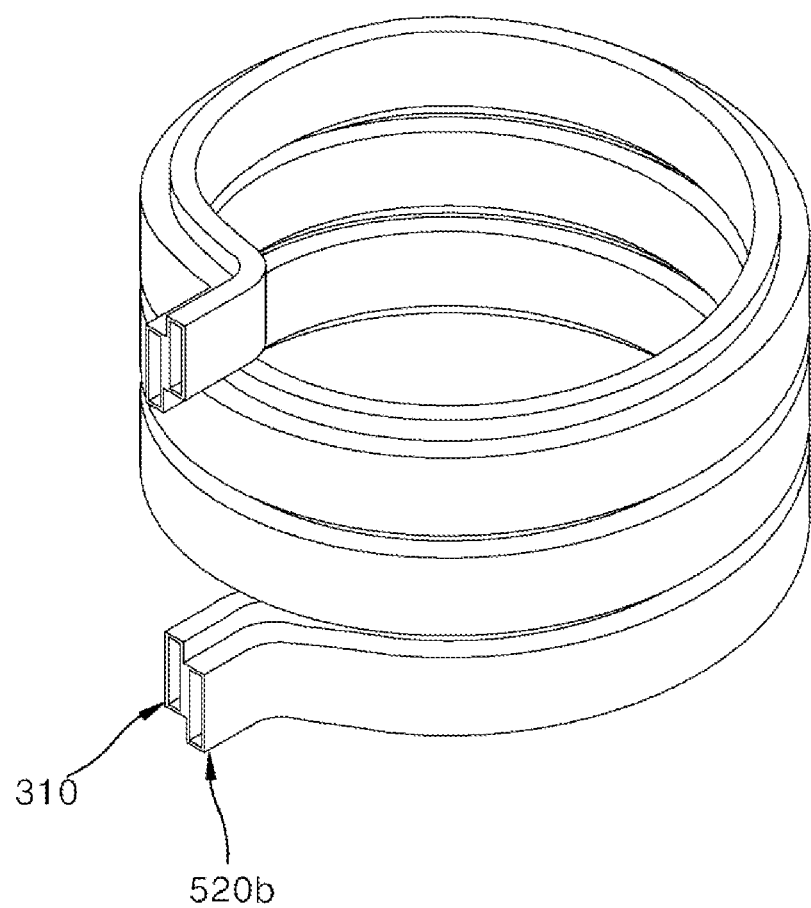
FIG. 18 is a perspective view showing another example of the cooling pipe of FIG. 16.
Figure 19:
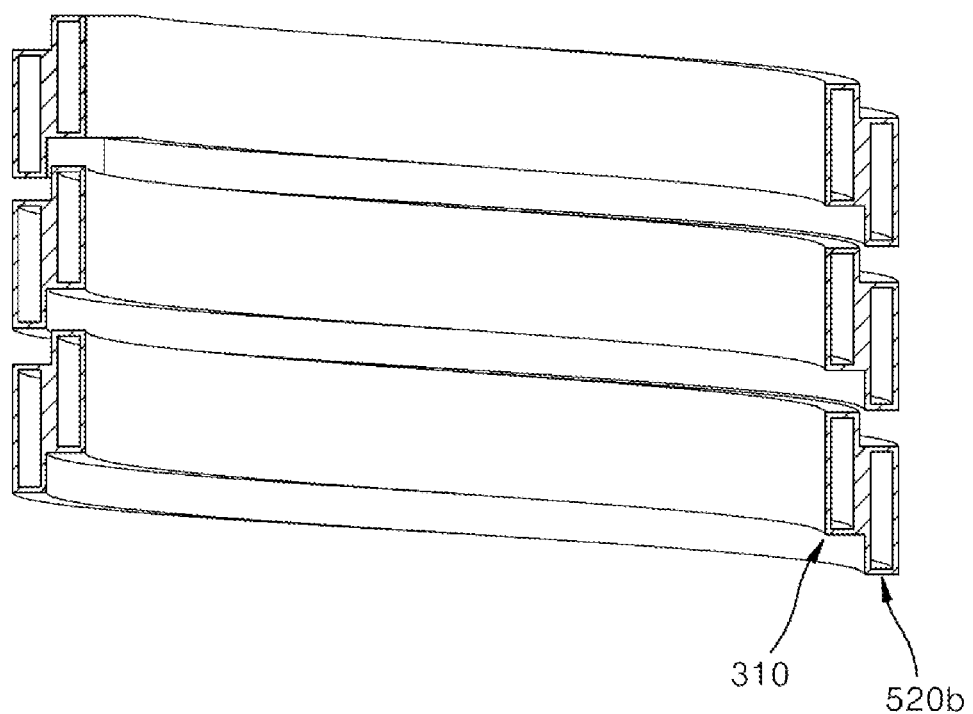
FIG. 19 is a longitudinal sectional view showing the cooling pipe of FIG. 18.

On the other hand, the helix cooling pipe 300 and the vibration absorbing pipe 500a are contactedly coupled to each other, without any coupling member 510b. As shown in FIGS. 16 to 19, the helix cooling pipe 300 and the vibration absorbing pipe 500a have a sectional shape of a rectangle and come into contact with each other to face each other. As shown in FIGS. 16 and 17, in this case, the helix cooling pipe 300 and the vibration absorbing pipe 500a are aligned to each other with respect to the radial direction of the housing body 110. Otherwise, as shown in FIGS. 18 and 19, the helix cooling pipe 300 and the vibration absorbing pipe 500a are misaligned to each other with respect to the radial direction of the housing body 110, while having a height difference therebetween.

As described above, the helix cooling pipe 300 has the cooling fluid inlet and outlet separated from each other to improve the cooling efficiency, and the vibrations are absorbed through the vibration absorbing pipe 500a. Further, the helix cooling pipe 300 is made by helixly machining an extruded pipe and by inserting the machined pipe into the mold for injection-molding the housing body 110, thereby achieving reduction in production time.

Hereinafter, the cooling pipe 200, that is, a U-shaped cooling pipe 400 will be explained.

Figure 20:
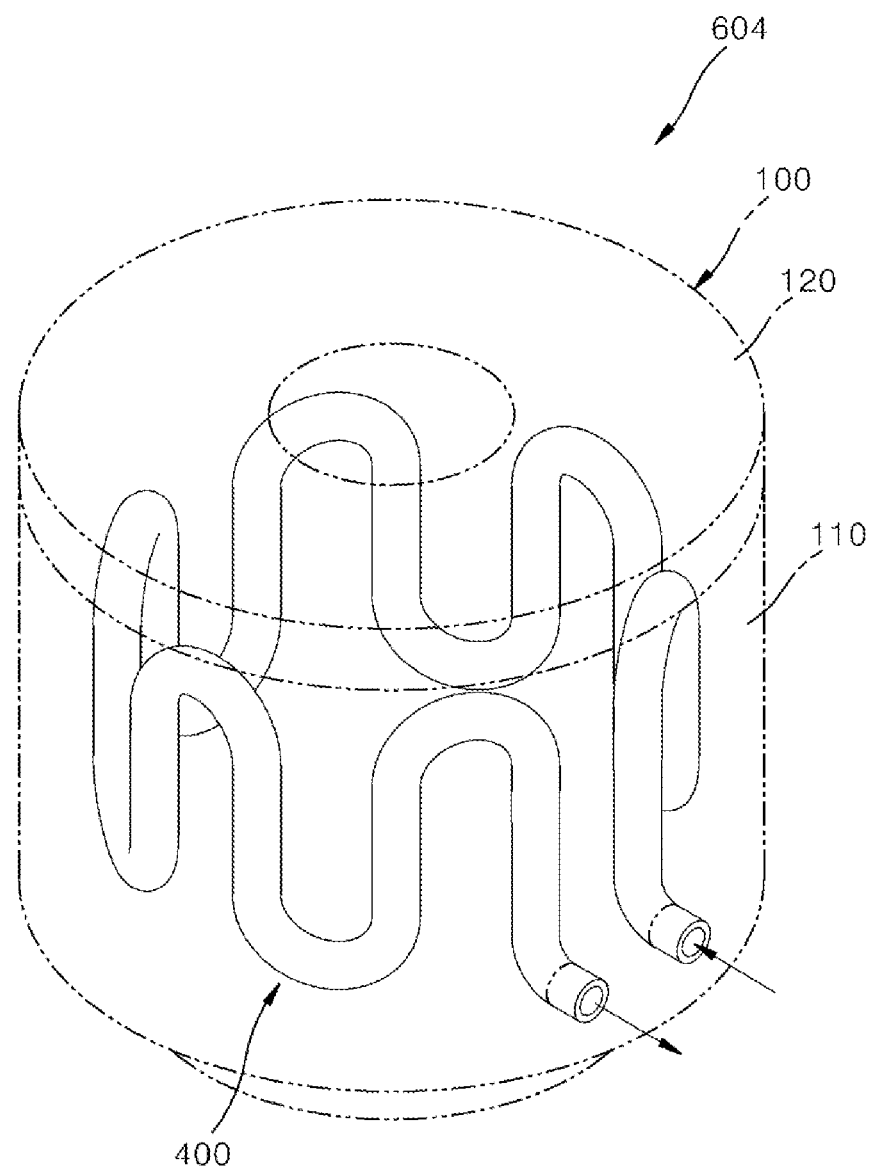
FIG. 20 is a perspective view showing a motor housing cooling device according to a second embodiment of the present invention.

Referring to FIG. 20, a motor housing cooling device 604 according to a second embodiment of the present invention includes the U-shaped cooling pipe 400 buried inside the outer peripheral surface of a housing body 110 in a circumferential direction of the housing body 110 in such a manner as to be bent in form of zigzag.

The U-shaped cooling pipe 400 includes linear pipes 410 and curved pipes 420 communicating with the linear pipes 410. The linear pipes 410 are erected in up and down directions in such a manner as to be spaced apart from each other at given intervals in the circumferential direction of the housing body 110.

The curved pipes 420 are bent to the shape of U in such a manner as to allow both end portions thereof to communicate with tops and undersides of the linear pipes 410 adjacent to each other.

Figure 21:
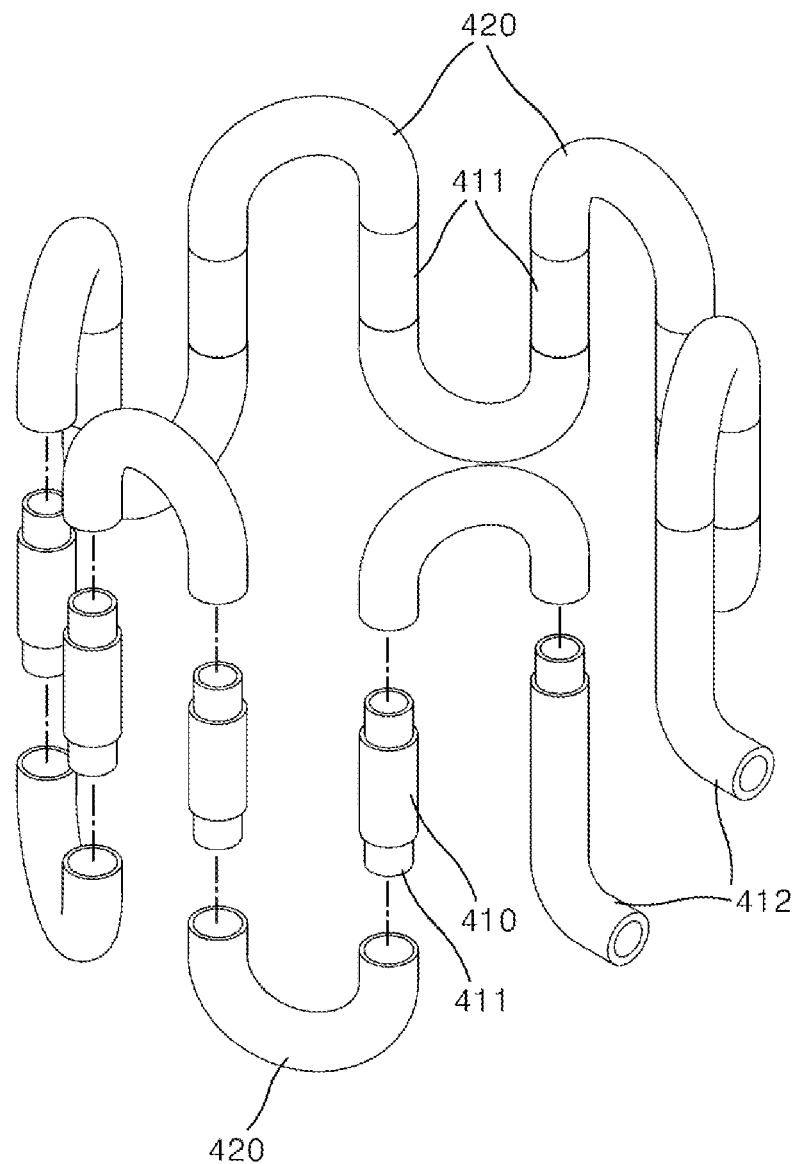
FIG. 21 is a perspective view showing a cooling pipe of FIG. 20.

On the other hand, the U-shaped cooling pipe 400 has the linear pipes 410 and the curved pipes 420 formed unitarily with each other, but as shown in FIG. 21, the linear pipes 410 and the curved pipes 420 are separately made and then coupled to each other in consideration of manufacturability and productivity. So as to allow the linear pipes 410 and the curved pipes 420 to be easily coupled to each other, in this case, insertion portions 411 are formed on the end peripheries of the linear pipes 410 in such a manner as to be inserted into the inner peripheries of the curved pipes 420. In the figure, the insertion portions 411 are formed on the end peripheries of the linear pipes 410, but if they have coupling structures, of course, they may be freely formed on the curved pipes 420 or both of the linear pipes 410 and the curved pipes 420.

Figure 22:
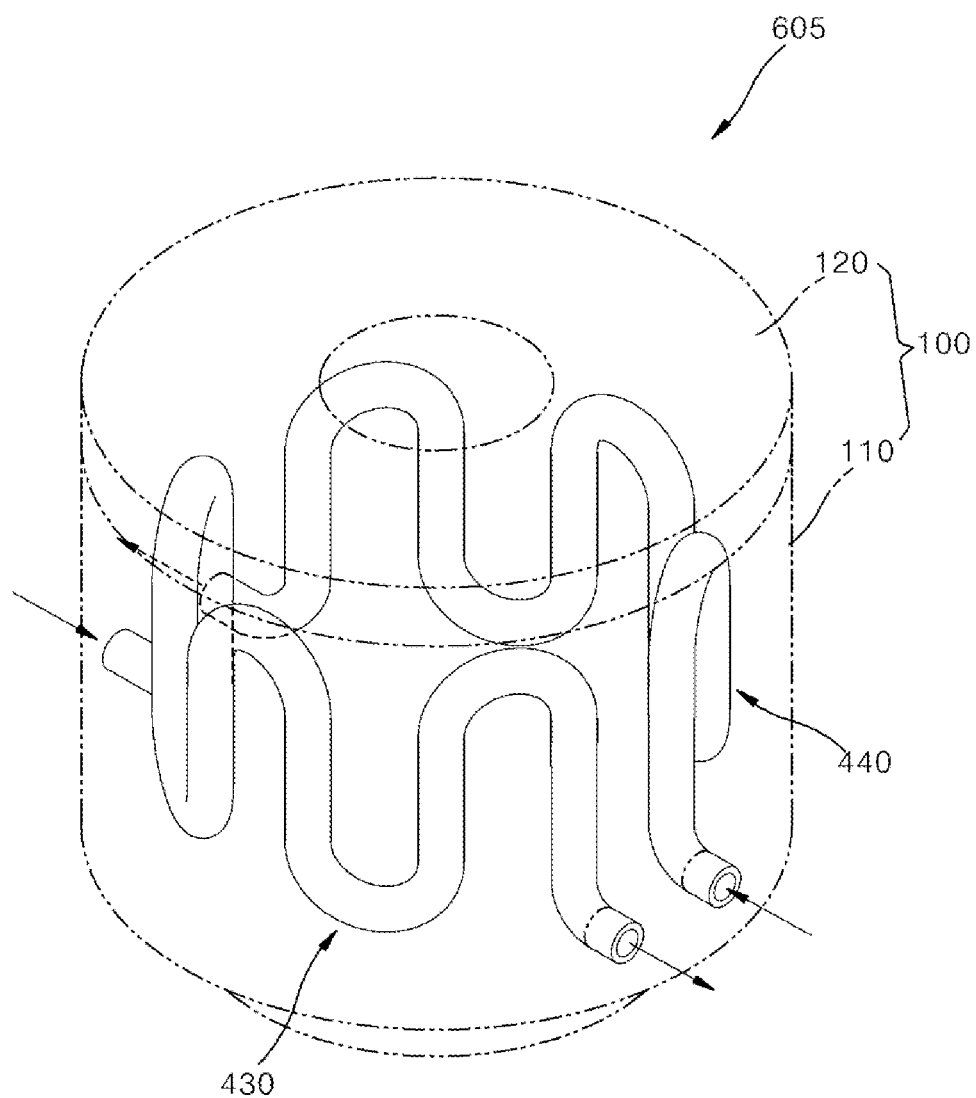
FIG. 22 is a perspective view showing another example of the cooling pipe of FIG. 20.
Figure 23:
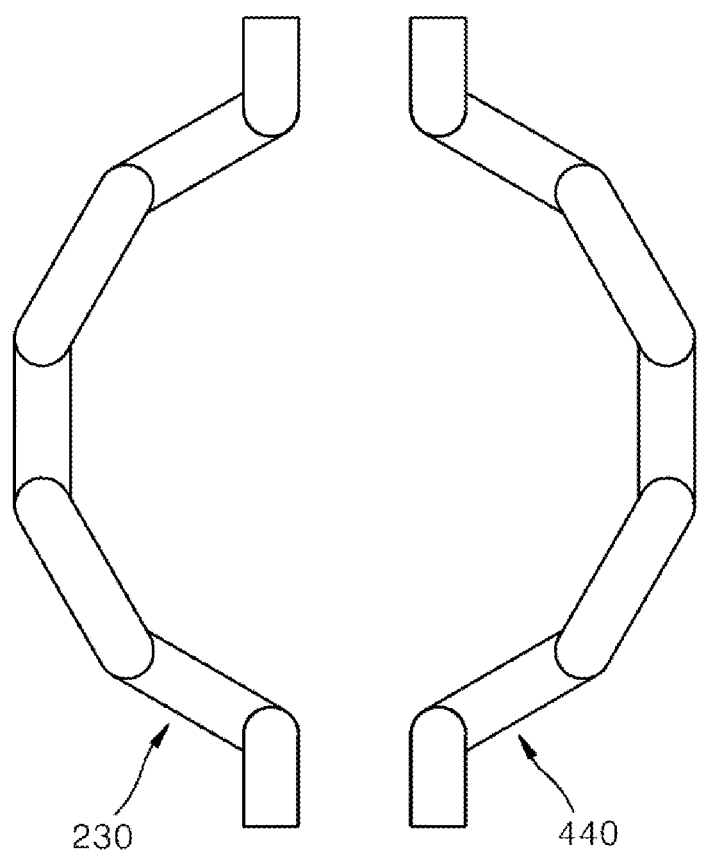
FIG. 23 is a plan view showing the cooling pipe of FIG. 22.

Referring to FIGS. 22 and 23, the U-shaped cooling pipe 400 includes a first U-shaped cooling pipe 430 and a second U-shaped cooling pipe 440 which have a semicircular shape in a plane direction and are symmetrically located to have a circular shape in the plane direction.

Figure 24:
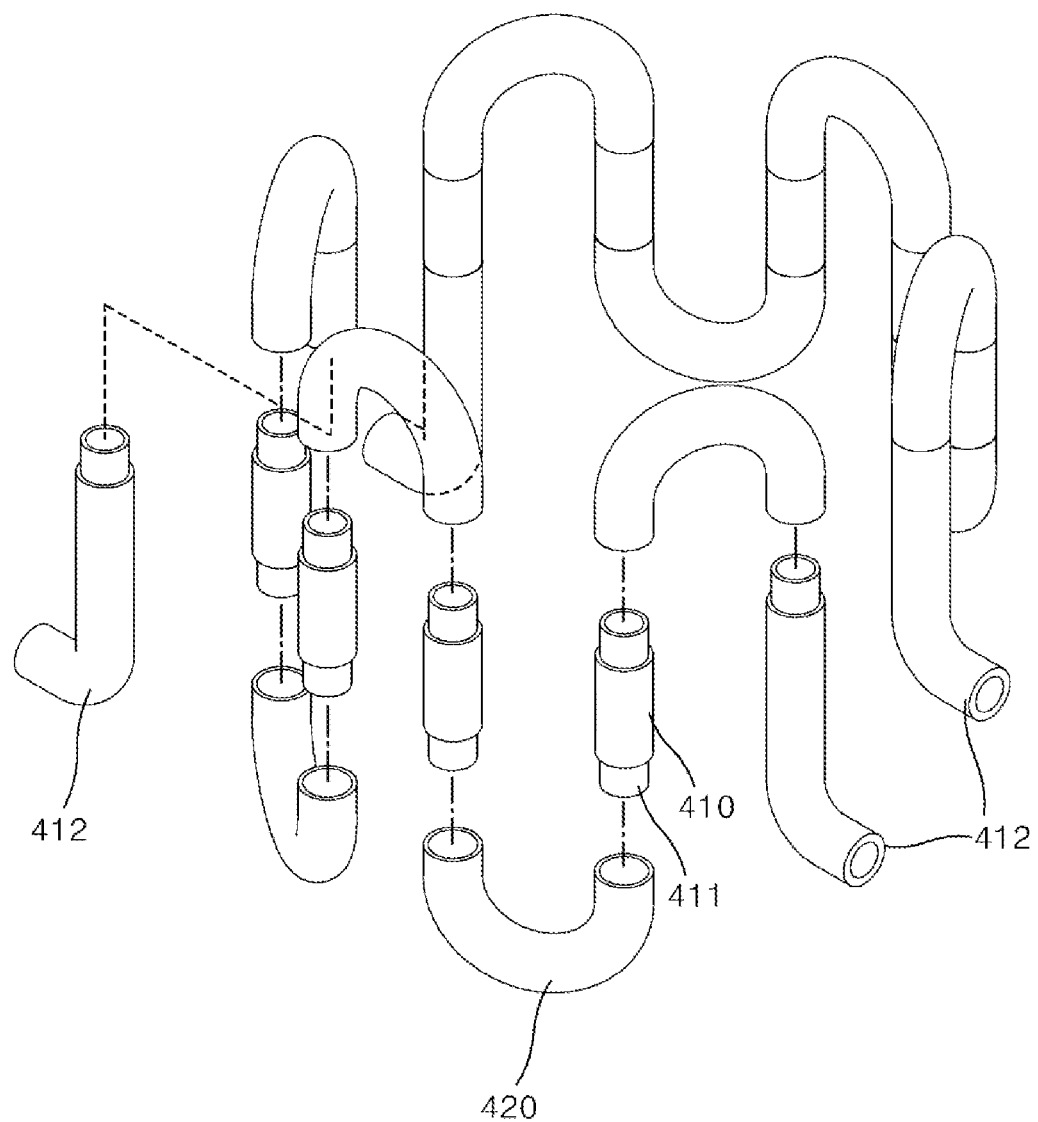
FIG. 24 is a perspective view showing another example of the cooling pipe of FIG. 22.

In this case, the first U-shaped cooling pipe 430 and the second U-shaped cooling pipe 440 may have the bent pipes and the linear pipes formed unitarily with each other, and otherwise, as shown in FIG. 24, their bent pipes and linear pipes are separately made and then coupled to each other.

The configurations of the first U-shaped cooling pipe 430 and the second U-shaped cooling pipe 440 through the unitary or separate coupling are the same as those of the U-shaped cooling pipe 400 as mentioned above, and a detailed explanation on them will be avoided.

On the other hand, the first U-shaped cooling pipe 430 is configured to allow the cooling fluid to be introduced into one side of the front thereof and to be discharged to the other side of the rear thereof, and the second U-shaped cooling pipe 440 is configured to allow the cooling fluid to be introduced into the other side of the rear thereof and to be discharged to the other side of the front thereof, so that the cooling fluids flowing along the first U-shaped cooling pipe 430 and the second U-shaped cooling pipe 440 have different flows from each other.

Figure 25:
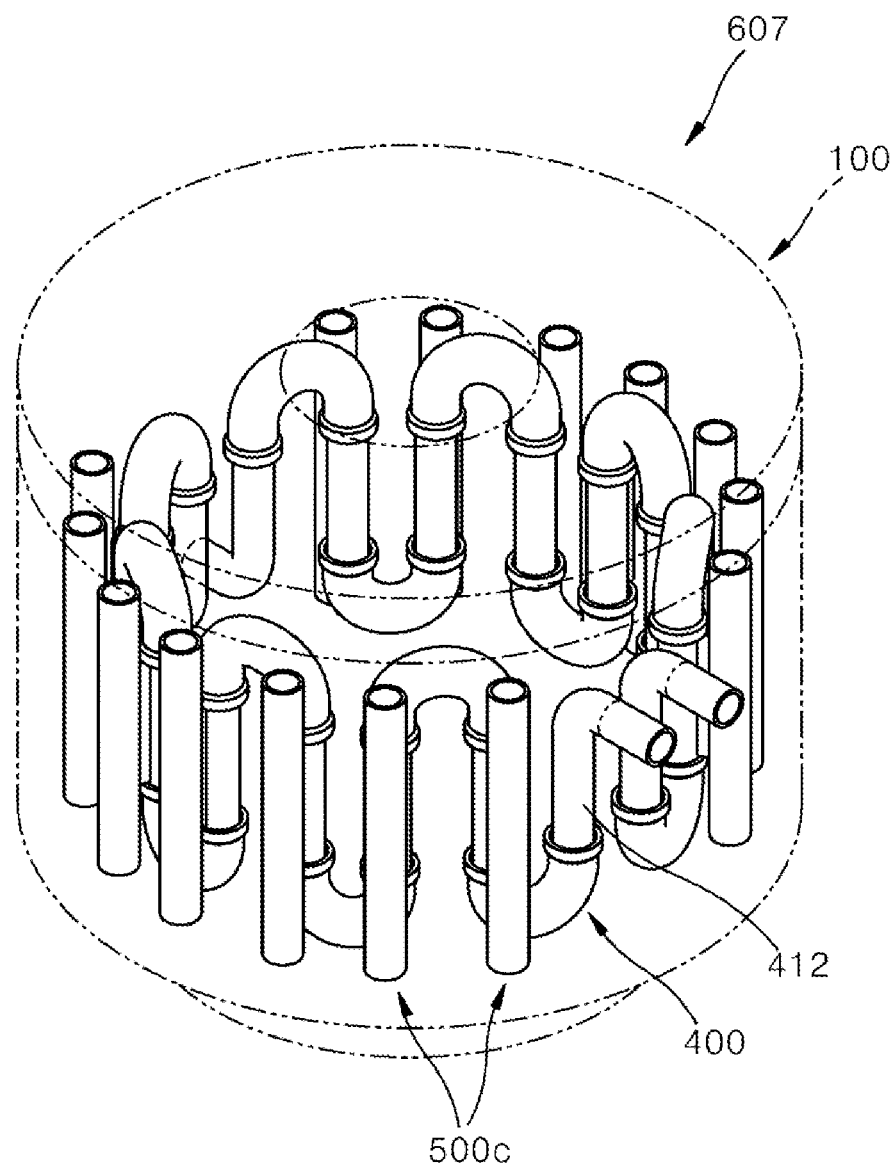
FIG. 25 is a perspective view showing a state where vibration absorbing pipes is disposed on the cooling pipe of FIG. 24.
Figure 26:
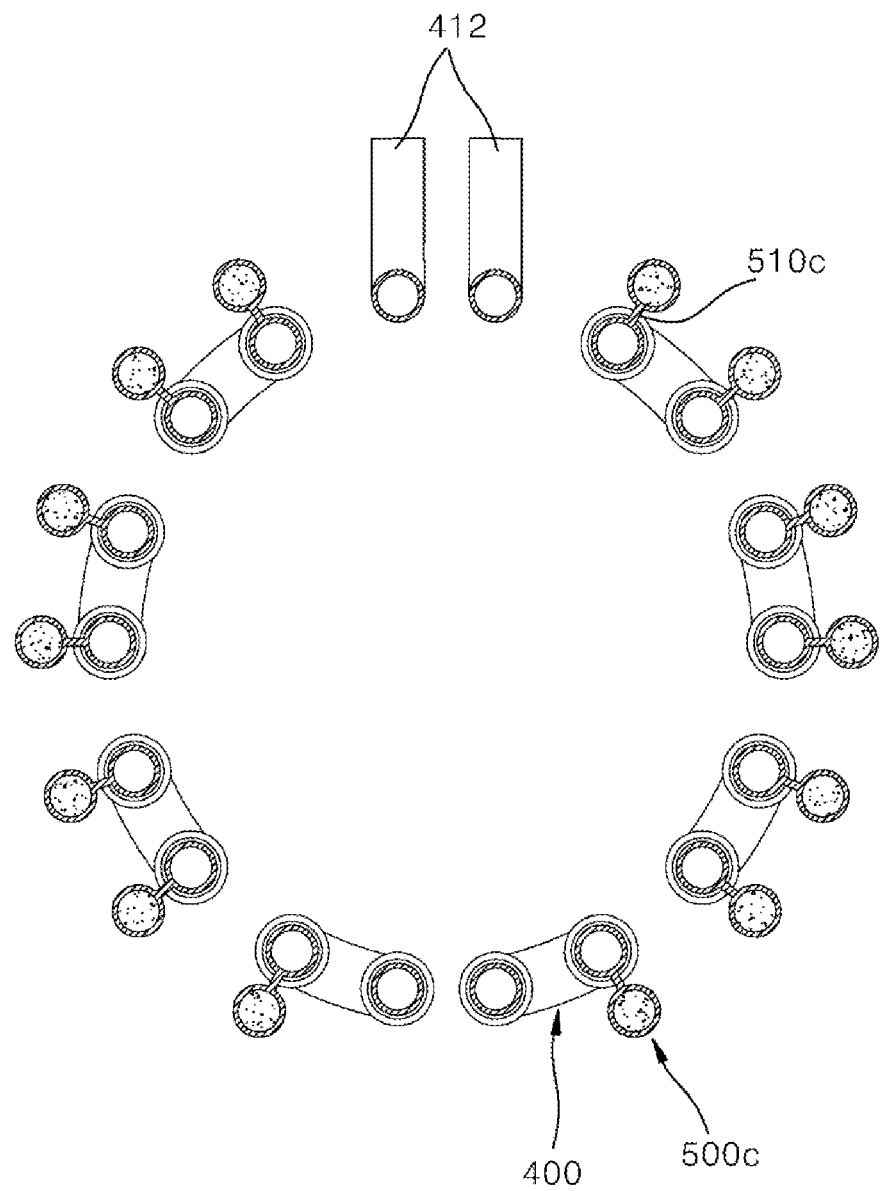
FIG. 26 is a plan sectional view showing the cooling pipe and the vibration absorbing pipe of FIG. 25.

Referring to FIGS. 25 and 26, a motor housing cooling device 607 according to the present invention includes vibration absorbing pipes 500c coupled to side peripheral surfaces of the U-shaped cooling pipes 400 to absorb vibrations. As shown, each vibration absorbing pipe 500c includes a pipe-shaped body 520c coupled to the side peripheral surface of the U-shaped cooling pipe 400 in such a manner as to be spaced apart therefrom by means of a coupling member 510c and a vibration absorbing material 530c filled in the body 520c. In this case, the body 520c and the vibration absorbing material 530c of the vibration absorbing pipe 500c are the same components as the helix cooling pipe 300, and accordingly, only different characteristics of the vibration absorbing pipe 500c from the helix cooling pipe 300 520a will be explained.

Figure 27:
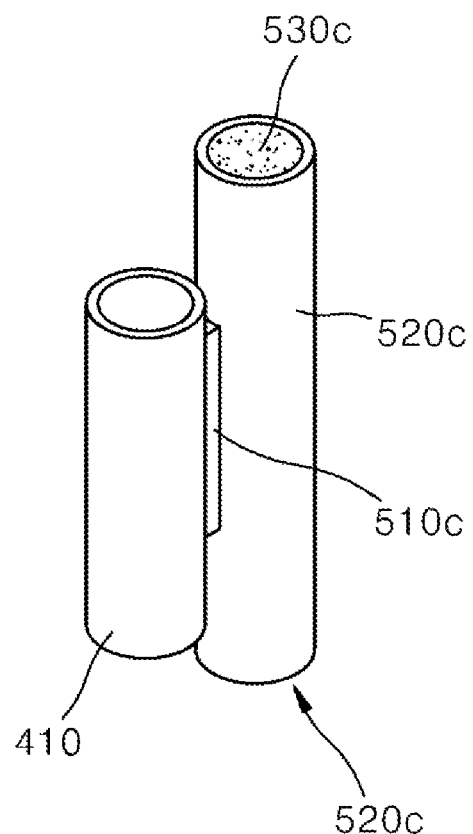
FIG. 27 is a perspective view showing a coupling structure of the vibration absorbing pipe coupled to the cooling pipe of FIG. 25 through a coupling member.

The vibration absorbing pipes 500c are coupled to the outer peripheral surfaces of the linear pipes 410 through the coupling members 510c and are thus arranged radially. As shown in FIG. 27, each vibration absorbing pipe 500c is erected in an up and down direction in such a manner as to correspond to the linear pipe 410.

Figure 28:
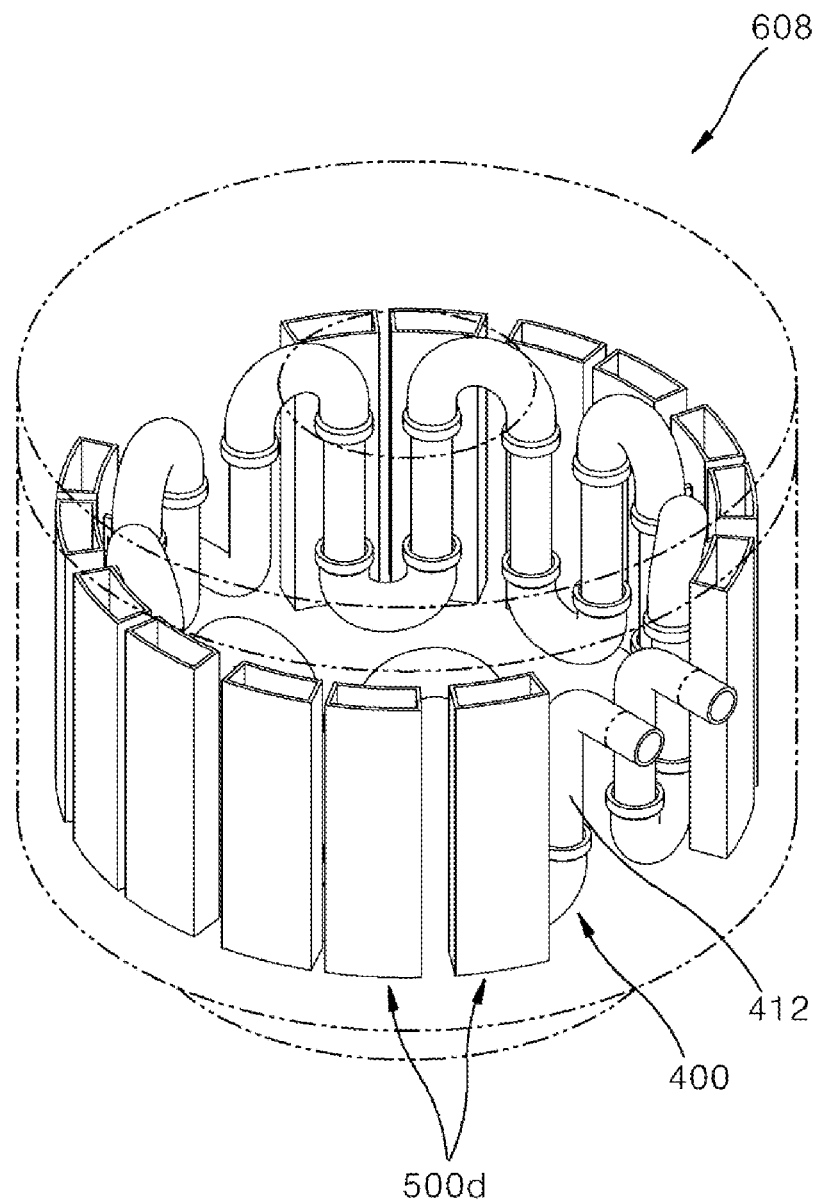
FIG. 28 is a perspective view showing another example of the vibration absorbing pipes of FIG. 25.
Figure 29:
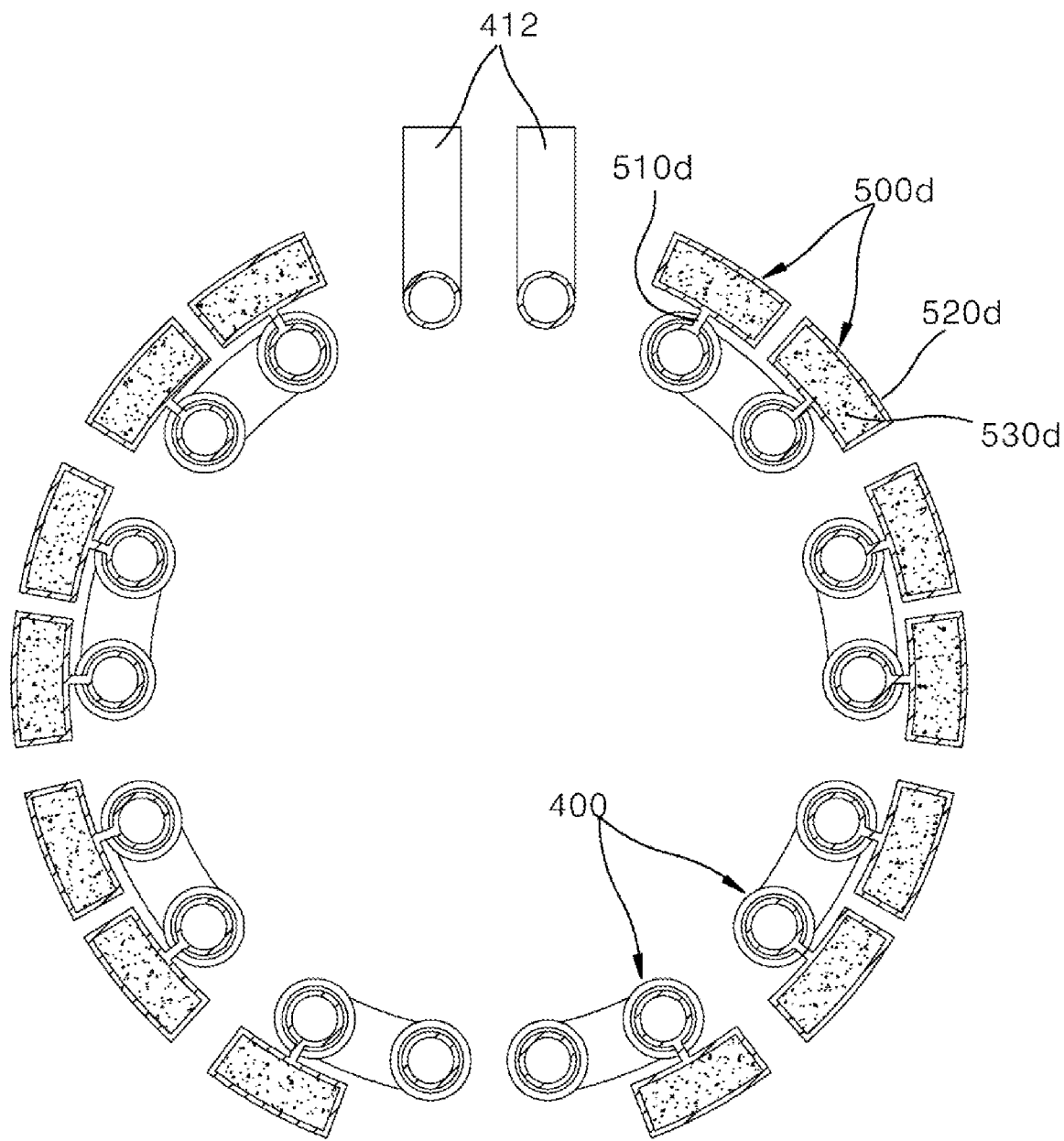
FIG. 29 is a plan sectional view showing the cooling pipes and the vibration absorbing pipes of FIG. 28.

The vibration absorbing pipe 500c has a sectional shape of a circle in a radial direction thereof, and otherwise, as shown in FIGS. 28 and 29, a vibration absorbing pipe 500d has a sectional shape of a rectangle.

As described above, the U-shaped cooling pipe 400 has the cooling fluid inlet and outlet separated from each other to improve the cooling efficiency, and the vibrations are absorbed through the vibration absorbing pipes 500b, 500c and 500d. Further, the U-shaped cooling pipe 400 minimizes a flowing distance of the cooling fluid to rapidly discharge the cooling fluid heated by absorbing heat from the motor and is configured to couple extruded pipes in the form of modules so that a tolerance of a product required for the insert injection molding can be ensured to reduce a failure rate upon the insert injection molding, thereby saving a manufacturing cost.

On the other hand, a method for manufacturing the motor housing cooling device according to the present invention is carried out by means of insert injection molding.

Figure 30:
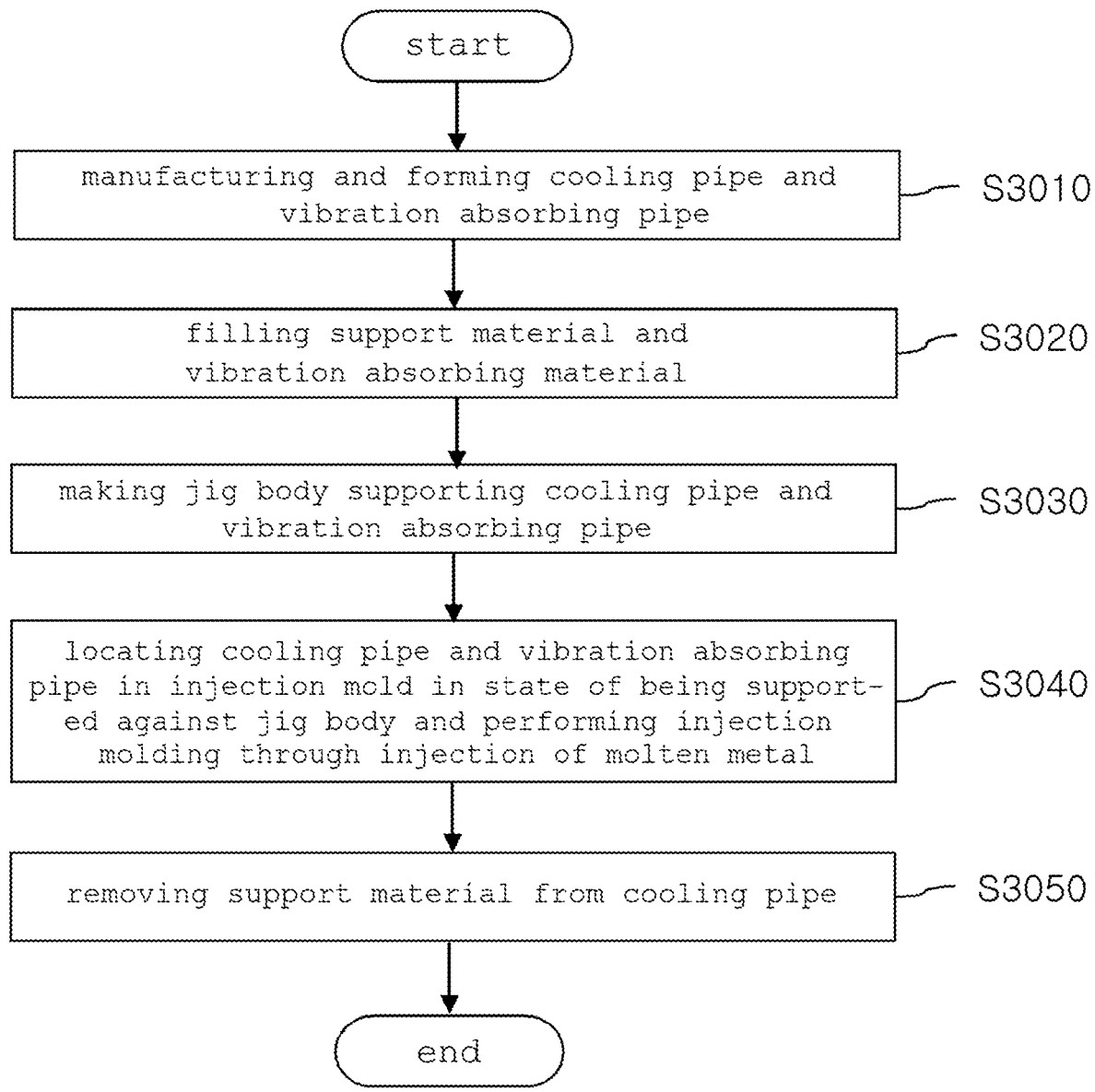
FIG. 30 is a flowchart showing a method for manufacturing the motor housing cooling device according to the first embodiment of the present invention.

FIG. 30 is a flowchart showing a method for manufacturing the motor housing cooling device according to the first embodiment of the present invention.

Referring to FIG. 30, the method for manufacturing the motor housing cooling device according to the first embodiment of the present invention includes the steps of: making a cooling pipe and a vibration absorbing pipe and forming the cooling pipe and the vibration absorbing pipe to shapes capable of being buried in a housing body (Step S3010); filling the cooling pipe with a removable support material and the vibration absorbing pipe with a vibration absorbing material as a support material (Step S3020); making a portion divided from the housing body as a jig body so as to support the cooling pipe and the vibration absorbing pipe against the jig body in an injection mold of the housing body (Step S3030); locating the cooling pipe and the vibration absorbing pipe in the injection mold of the housing body in such a manner as to be supported against the jig body and injecting a molten material constituting the housing body into the injection mold to mold the housing body (Step S3040); and after molding, removing the support material from the cooling pipe buried in the housing body (Step S3050).

After that, a motor is seated inside the housing body, and a cover is located on top of the housing body. Next, the inlet and outlet of the cooling pipe are connected to a cooling water circulation line to allow a cooling fluid to be circulated by means of a pump, thereby cooling the motor. Further, a heat exchanger is located on the cooling water circulation line to perform heat exchange with the cooling fluid, so that the cooling fluid flowing to the motor housing cooling device becomes cool.

According to the present invention, the cooling pipe and the vibration absorbing pipe have various shapes, and they have been in detail explained with reference to FIGS. 9 to 29. For example, the cooling pipe may be formed of the helix cooling pipe made by forming a single pipe helixly or the U-shaped cooling pipe made by connecting the linear pipes and the curved pipes in such a manner as to be vertically erected.

A method for burying the cooling pipe and the vibration absorbing pipe in the housing body is carried out by means of the insert injection molding, and during the insert injection molding, the pipes may be deformed due to a pressure applied from the molten metal. So as to prevent such deformation, the method according to the present invention includes the step (S3020) of filling the cooling pipe and the vibration absorbing pipe with the support material 300a to allow the cooling pipe and the vibration absorbing pipe to be resistant with the pressure of the molten metal upon the molding of the product. At this time, a particulate material may be used as the support material 300, and the particulate material, such as ceramic, sand, and balls (metal balls, that is, steel balls) is made of a material having a melting temperature higher than a high temperature of the molten metal and a melting temperature of the pipe.

The support material 300a filled in the interior of the cooling pipe is a water soluble material. In this case, if water is poured into the cooling pipe after the housing body has been molded, the support material filled in the interior of the cooling pipe is melted by the water to make the cooling pipe empty, so that the housing body having a hollow portion formed therein can be molded.

For example, the water soluble support material 300a is made of salt. At this time, if the cooling pipe is made of aluminum and the molten metal is a high temperature aluminum molten material, a molten temperature of salt is higher than that of aluminum so that a portion of a surface of the hollow portion forming pipe 10 becomes molten and molded unitarily with the molten metal, and contrarily, salt is still kept in shape, thereby allowing the cooling pipe to be resistant with the pressure of the molten metal.

Figure 31:
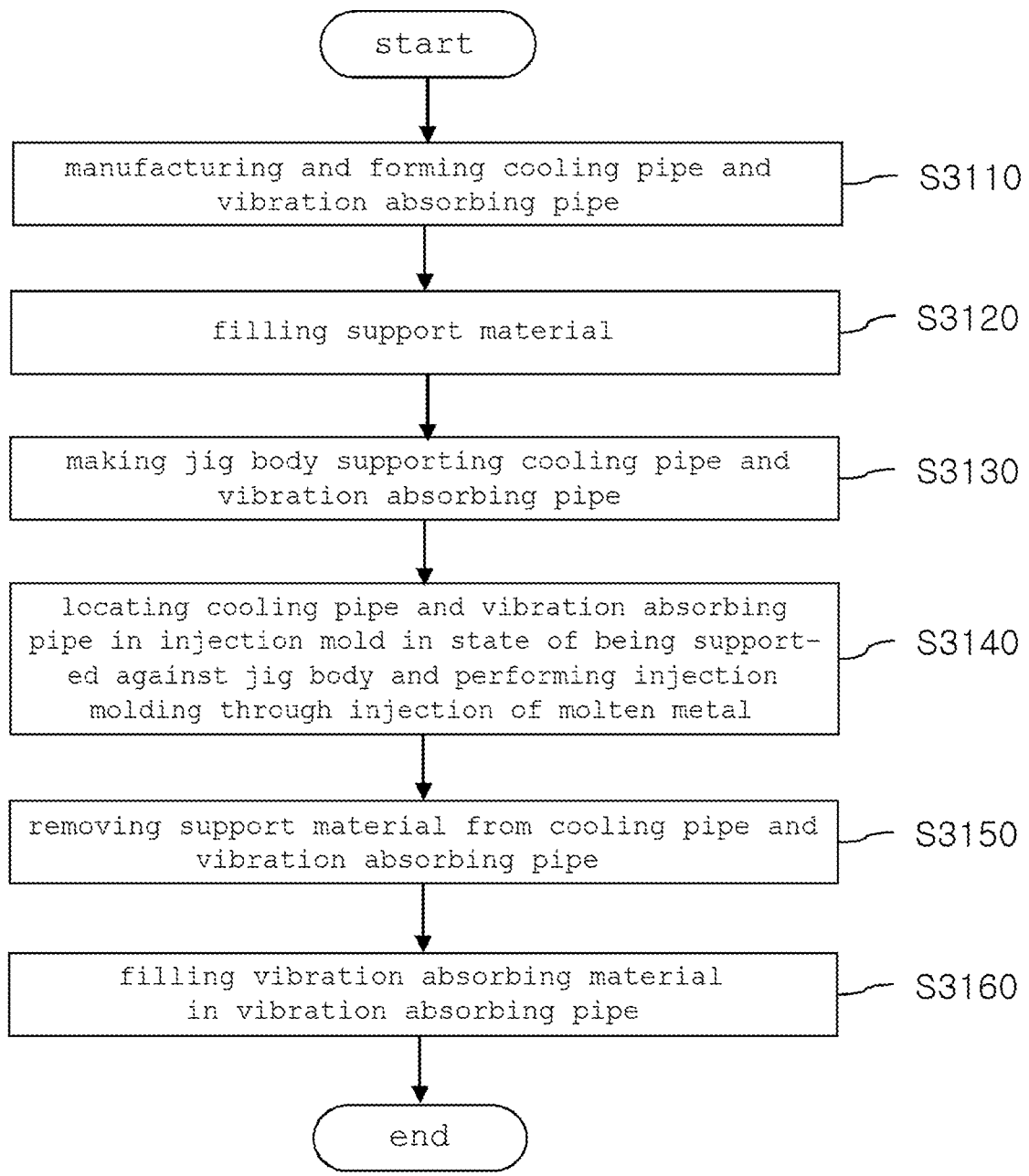
FIG. 31 is a flowchart showing a method for manufacturing the motor housing cooling device according to the second embodiment of the present invention.

FIG. 31 is a flowchart showing a method for manufacturing the motor housing cooling device according to the second embodiment of the present invention.

Referring to FIG. 31, the method for manufacturing the motor housing cooling device according to the second embodiment of the present invention includes the steps of: making a cooling pipe and a vibration absorbing pipe and forming the cooling pipe and the vibration absorbing pipe to shapes capable of being buried in a housing body (Step S3110); filling the cooling pipe and the vibration absorbing pipe with a support material to prevent the cooling pipe and the vibration absorbing pipe from being deformed due to injection of a molten metal upon insert injection molding (Step S3120); making a portion divided from the housing body as a jig body so as to support the cooling pipe and the vibration absorbing pipe against the jig body in an injection mold of the housing body (Step S3130); locating the cooling pipe and the vibration absorbing pipe in the injection mold of the housing body in such a manner as to be supported against the jig body and injecting the molten metal constituting the housing body into the injection mold to mold the housing body (Step S3140); after molding, removing the support material from the cooling pipe and the vibration absorbing pipe buried in the housing body (Step S3150); and filling the vibration absorbing pipe with a vibration absorbing material (Step S3160).

After that, a motor is seated inside the housing body, and a cover is located on top of the housing body. Next, the inlet and outlet of the cooling pipe are connected to a cooling water circulation line to allow a cooling fluid to be circulated by means of a pump, thereby cooling the motor. Further, a heat exchanger is located on the cooling water circulation line to perform heat exchange with the cooling fluid, so that the cooling fluid flowing to the motor housing cooling device becomes cool.

According to the present invention, the cooling pipe and the vibration absorbing pipe have various shapes, and they have been in detail explained with reference to FIGS. 9 to 29. For example, the cooling pipe may be formed of the helix cooling pipe made by forming a single pipe helixly or the U-shaped cooling pipe made by connecting the linear pipes and the curved pipes in such a manner as to be vertically erected.

A method for burying the cooling pipe and the vibration absorbing pipe in the housing body is carried out by means of the insert injection molding, and during the insert injection molding, the pipes may be deformed due to a pressure applied from the molten metal. So as to prevent such deformation, the method according to the present invention includes the step (S3120) of filling the cooling pipe and the vibration absorbing pipe with the support material 300a to allow the cooling pipe and the vibration absorbing pipe to be resistant with the pressure of the molten metal upon the molding of the product. At this time, a particulate material may be used as the support material 300, and the particulate material, such as ceramic, sand, and balls (metal balls, that is, steel balls) is made of a material having a melting temperature higher than a high temperature of the molten metal and a melting temperature of the pipe.

The support material 300a filled in the interior of the cooling pipe is a water soluble material. In this case, if water is poured into the cooling pipe after the housing body has been molded, the support material filled in the interior of the cooling pipe is melted by the water to make the cooling pipe empty, so that the housing body having a hollow portion formed therein can be molded.

For example, the water soluble support material 300a is made of salt. At this time, if the cooling pipe is made of aluminum and the molten metal is a high temperature aluminum molten material, a molten temperature of salt is higher than that of aluminum so that a portion of a surface of the hollow portion forming pipe 10 becomes molten and molded unitarily with the molten metal, and contrarily, salt is still kept in shape, thereby allowing the cooling pipe to be resistant with the pressure of the molten metal.

Figure 32:
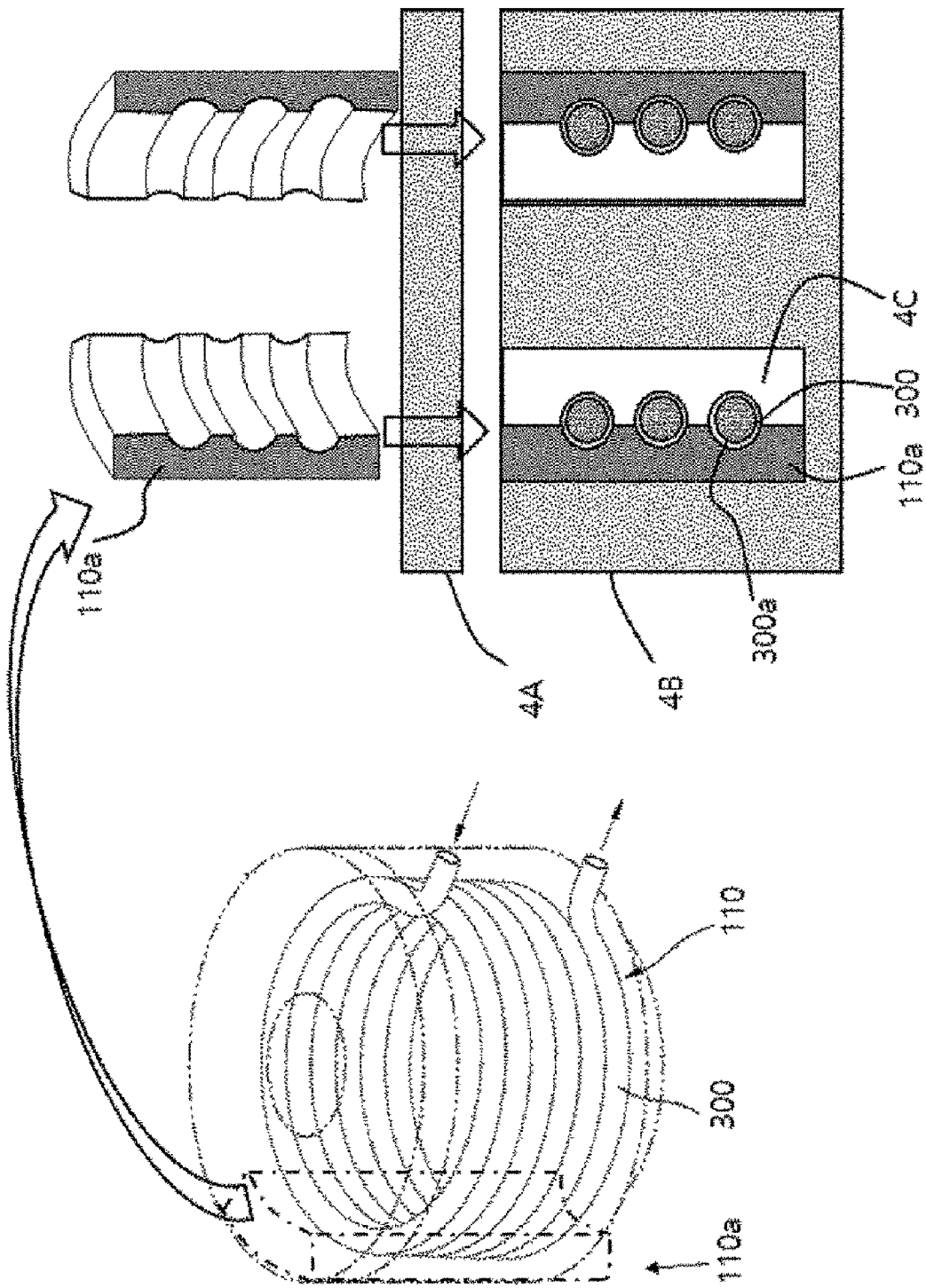
FIG. 32 is a perspective view showing a state where the cooling pipe is inserted into the mold having a jig body in the method for manufacturing the motor housing cooling device according to the present invention.

FIG. 32 is a perspective view showing a state where the cooling pipe inserted into the mold according to the present invention.

When the cooling pipe 300 is located in the cavity 4C of the mold 4, both end portions of the cooling pipe 300 are drawn to the outside from the cavity 4C in such a manner as to be fixedly supported against the lower mold 4B. However, there is no support means for the cooling pipe 300 inside the cavity 4C. If the molten metal is pressurizedly injected, accordingly, the cooling pipe 300 floating in the space may be deviated from its position by means of the molten metal injected, and the formed shape of the cooling pipe 300 may be changed. The cooling pipe 300 itself can be prevented from being deformed because it is filled with the support material 300a.

According to the present invention, as shown in FIG. 32, a jig body 110a for supporting and fixing the cooling pipe 300 into the cavity 4C of the mold 4 for the housing body 110 is prefabricated (Step S30). The jig body 110a is a prefabricated portion of the housing body 110 that is made of the same material as the housing body 110. Of course, the jig body 110a may be made of a different material from the housing body 110.

The cooling pipe 300 is located inside the housing body 110, and accordingly, it floats in the space of the cavity 14C, so that a jig for general injection molding cannot be used. According to the present invention, therefore, the jig body 110a, which is capable of supporting the cooling pipe 300 inside the cavity 4C and being formed unitarily with the housing body 110 after molding, is made as the jig. That is, a portion of the housing body 110 is prefabricated as the jig body 110a.

The jig body 110a is simply configured to support the cooling pipe 300 in the space of the cavity 4C, to become any one of an inner body and an outer body divided around the cooling pipe 300, or to have a plurality of jig bodies 110a made by allowing the housing body 110 except the cooling pipe 300 to be divided into a plurality of pieces. This can be designed to prevent the deformation of the cooling pipe 300 and also to fix the position of the cooling pipe 300 in consideration of the shape or size of the cooling pipe 300.

Further, one or a plurality of jig bodies 110a may be provided, and if the plurality of jig bodies 110a are provided, they have widths whose portions smaller than their original body widths, so that their facing portions have sufficient gaps therebetween. Further, the jig body 110a has a plurality of injection grooves formed on the supporting surface thereof to allow the molten metal to be injected into the surface of the cooling pipe or the vibration absorbing pipe coming into contact therewith, so that the surface of the cooling pipe or the vibration absorbing pipe is melted and unitary with the jig body 110a. In detail, the molten metal can be easily injected into the contact surface of the jig body 110a with the cooling pipe or the vibration absorbing pipe.

FIG. 32 shows the jig body 110a in the motor housing cooling device having the helix cooling pipe 300, but one or more jig bodies 110 may be made to appropriate shapes according to various structures such as a structure only having the U-shaped cooling pipe, a structure where the vibration absorbing pipe is connected to the helix cooling pipe, and a structure where the vibration absorbing pipes are coupled to the U-shaped cooling pipe, so that they stably support and fix the pipes in the cavity 4C to prevent the pipes from being misaligned or changed in position upon injection of the molten metal.

Like this, a portion of the housing body 110 is prefabricated as the jig body 110a, and the jig body 110a and the cooling pipe 300 are coupled to each other and located inside the cavity 4C, as shown in FIG. 32.

The molten metal made of the same material as the jig body 110a is injected into the cavity 4C to surround the cooling pipe 300, so that the housing body 110 formed unitarily with the jig body 110a is molded (Step S3150).

At this time, the jig body 110a is made of the same material as the molten metal, and if the molten metal is injected into the cavity 4C, the jig body 110a is unitary with the molten metal to form a single body and surrounds the cooling pipe 300. Of course, if the cooling pipe 300 is made of the same material as the molten metal, the surface of the cooling pipe 300 is molten and thus unitary with the housing body 110.

As the jig body 110a is made of a different material from the molten metal, the jig body 110a may be made of a material having different strength from a material of the remaining body portion. In detail, if the cooling pipe 300 and the jig body 110a are made of the same metal as the housing body 110, they are molded unitarily with the housing body 110.

Of course, the cooling pipe and the jig body may be made of different materials from each other, so that they are molded unitarily with each other in the housing body 110. However, desirably, the cooling pipe and the jig body are made of the same material as each other. After molding, the support material 300a is removed from the cooling pipe 300 to allow the cooling fluid to flow along the cooling pipe whose inside is empty.

For example, the method for manufacturing the cooling device according to the present invention is applied to the structure where only the cooling pipe is provided, but of course, it is possible that the method is applied to the structure where the cooling pipe and the vibration absorbing pipe are all provided. In the filling and removing embodiments of the support material, further, the support material is filled in the cooling pipe, while the vibration absorbing material is being filled in the vibration absorbing pipe, and the cooling pipe and the vibration absorbing pipe are located inside the cavity to mold the housing body by means of insert injection molding, so that only the support material is removed from the cooling pipe, and the vibration absorbing material remains in the vibration absorbing pipe.

Otherwise, the support material is filled in both of the cooling pipe and the vibration absorbing pipe, and after molding, the support material is removed from both of the cooling pipe and the vibration absorbing pipe. Next, a vibration absorbing material is filled in the vibration absorbing pipe.

So as to remove the support material from the vibration absorbing pipe and to fill the vibration absorbing material therein, after molding, both end portions of the vibration absorbing pipe have to be drawn from the outside of the housing body. In case of the helix vibration absorbing pipe coupled to the helix cooling pipe, both end portions of the vibration absorbing pipe are drawn from the outside of the housing body, and after molding, the support material is removed from the vibration absorbing pipe to allow the vibration absorbing material to be filled in the vibration absorbing pipe.

If a plurality of linear vibration absorbing pipes is arranged in the structure having the U-shaped cooling pipe, however, the vibration absorbing material has to be filled in the vibration absorbing pipes before molding. In the structure having the U-shaped cooling pipe, a removable support material is filled in the U-shaped cooling pipe, and a vibration absorbing material, which is not necessary to be removed, is filled in the vibration absorbing pipes. After the insert injection molding, only the support material is removed from the U-shaped cooling pipe, and the vibration absorbing material still remains in the vibration absorbing pipes.

As the motor is insertedly seated on the center of the housing body and the cover is then coupled to top of the housing body, the motor housing cooling device according to the present invention and the motor housing cooling device made using the method for manufacturing the cooling device according to the present invention can be installed as the motor housing.

Next, both ends of the cooling pipe, which are drawn to the outside of the motor housing, are connected as an inlet and an outlet for the cooling fluid, and the cooling fluid is circulated by means of a pump. Heat exchange for the cooling fluid circulated by means of the pump is performed by means of a heat exchanger. At this time, the motor housing cooling device serves to cool the motor to a given temperature through a temperature sensor, the pump, and a valve.

The motor housing cooling device according to the present invention provides a more compacted structure when compared with the existing structure wherein the cooling pipe is located on the outer peripheral surface of the housing body or the existing air cooled type structure, and moreover, the motor housing cooling device according to the present invention allows the cooling fluid to flow along the cooling pipe buried in the body of the motor housing, thereby improving the cooling efficiency. Accordingly, the motor housing cooling device according to the present invention can be installed as the housing cooling device for a motor of an electric vehicle, that is, a motor used as a power source of an electric vehicle.

If the motor housing cooling device according to the present invention and the motor housing cooling device made using the method for manufacturing the cooling device according to the present invention are installed as the cooling device for the motor of the electric vehicle, accordingly, advantages such as a compact structure and an improvement of cooling efficiency are applied to the cooling device for the motor of the electric vehicle, thereby effectively reducing the weight of the electric vehicle and increasing the cooling efficiency of the motor.

As described above, the method for manufacturing the hollow product according to the present invention is carried out by filling the hollow portion forming pipe with salt, heat-resistant powder, heat-resistant grains, or heat-resistant fibers, inserting the hollow portion forming pipe in the cavity of the mold while the hollow portion forming pipe is being fixedly supported against the jig body prefabricated by dividing a portion of the hollow product, injecting and curing the molten metal (liquid material for molding the product) into the cavity of the mold, and producing the hollow product having the hollow portion forming pipe buried therein. After the molding, further, the support material is removed from the hollow portion forming pipe, so that the hollow product having the hollow portion forming pipe whose inside is empty can be produced.

According to the present invention, further, the hollow portion forming pipe is fixedly supported in the cavity through the jig body, so that it is possible to mold the hollow product in a state where the hollow portion forming pipe is accurately located, without any misalignment or deformation upon the injection of the molten metal, and if the support material is a water soluble material, water is injected into the hollow portion forming pipe, after the molding, to allow the support material to be easily removed therefrom.

In addition, the motor housing cooling device according to the present invention has the following effects.

Firstly, the path of the cooling pipe is completely sealed to provide the leak-free pipe and also to prevent the presence of thermal cross-talk, thereby maintaining and improving cooling performance.

Secondly, unlike the conventional practice wherein separate machining after die casting and parts for sealing are needed to thus make manufacturing process and cost undesirably complicated and raised, the extruded pipe is machined and inserted into the motor housing mold for the insert injection molding, thereby reducing the production time and lowering the manufacturing cost.

Lastly, unlike the conventional practice wherein a region for the cooling fluid is narrow and an inlet and an outlet for the cooling fluid are located on the same line as each other, the inlet and an outlet for the cooling fluid are separated from each other, thereby improving the cooling efficiency.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method for manufacturing a cooling device for circulating a cooling fluid along a cooling pipe, the method comprising the steps of:
   making the cooling pipe and forming the cooling pipe to a shape capable of being buried in a housing body;
   filling the cooling pipe with a support material;
   making a portion divided from the housing body as a jig body so as to support the cooling pipe against the jig body in an injection mold of the housing body;
   locating the cooling pipe in the injection mold of the housing body in such a manner as to be supported against the jig body and injection-molding the housing body; and
   after the injection molding, removing the support material from the cooling pipe.

2. The method according to claim 1, wherein the cooling pipe is a helix cooling pipe formed by winding a single pipe helixly with respect to the housing body.

3. The method according to claim 1, wherein the cooling pipe is a U-shaped cooling pipe formed by bending a single pipe in form of zigzag to have a circular shape in a plane direction.

4. The method according to claim 1, wherein one or a plurality of jig bodies is provided, and the plurality of jig bodies have widths whose portions are smaller than original body widths thereof, so that facing portions of the jig bodies have sufficient gaps therebetween.

5. The method according to claim 1, wherein, the jig body has a plurality of injection grooves formed on a surface thereof to allow a liquid material of the housing body to be injected thereinto.

6. The method according to claim 1, wherein the support material is made of at least one selected from the group consisting of a water soluble material, non-organic grains or der, heat-resistant grains or powder, and heat-resistant fibers, and after molding the housing body, water is injected into the cooling pipe to remove the support material from the cooling pipe.

7. The method according to claim 1, wherein the cooling pipe is coupled to a vibration absorbing pipe, and a vibration absorbing material as a support material is filled in the vibration absorbing pipe, so that the vibration absorbing pipe is buried in the housing body, together with the cooling pipe, through the injection molding of the housing body, and after the molding, the support material inside the cooling pipe is removed, while the vibration absorbing material inside the vibration absorbing pipe is not removed.

8. The method according to claim 1, wherein the cooling pipe is coupled to a vibration absorbing pipe, and the support material is filled in the vibration absorbing material as well as the cooling pipe, so that the vibration absorbing pipe is buried in the housing body, together with the cooling pipe, through the injection molding of the housing body, and after the molding, the support material inside the cooling pipe and the vibration absorbing pipe is removed, while a vibration absorbing material is being filled in the vibration absorbing pipe from which the support material is removed.

9. The method according to claim 1, wherein the cooling device is configured to allow the cooling pipe to be buried in the housing body having an accommodation space formed therein to locate a motor therein and to allow the cooling fluid to be circulated through the cooling pipe so that the motor becomes cool.

10. A motor housing cooling device comprising:
    a motor housing having a housing body having an accommodation space formed therein to locate a motor therein and a cover adapted to close the housing body;
    a U-shaped cooling pipe buried in form of zigzag in the housing body in an up and down direction of the housing body in such a manner as to allow a cooling fluid to flow therealong; and
    vibration absorbing pipes adapted to absorb vibrations, each vibration absorbing pipe having a pipe-shaped body coupled to a side periphery surface of the U-shaped cooling pipe and a vibration absorbing material filled in the body,
    wherein after the U-shaped cooling pipe is filled with a removable support material and the vibration absorbing pipes are filled with the vibration absorbing material, the U-shaped cooling pipe and the vibration absorbing pipes are located in a housing body injection mold in such a manner as to allow the U-shaped cooling pipe and the vibration absorbing pipes to be supported against a jig body made by dividing a portion of the housing body and to allow the housing body to be molded by means of insert injection molding, and after molding, the support material filled in the U-shaped cooling pipe is removed to provide the housing body where the U-shaped cooling pipe and the vibration absorbing pipes are buried in form of hollow portions,
    so that the motor becomes cool through circulation of the cooling fluid along the U-shaped cooling pipe.

11. The motor housing cooling device according to claim 10, wherein the U-shaped cooling pipe comprises:
    a plurality of linear pipes erected in up and down directions in such a manner as to be spaced apart from each other at given intervals; and
    curved pipes bent to allow both end portions thereof to communicate with tops and undersides of the linear pipes adjacent to each other.

12. The motor housing cooling device according to claim 11, wherein bodies of the vibration absorbing pipes are coupled to the side peripheral surface of the U-shaped cooling pipe in such a manner as to be spaced apart therefrom by means of coupling members.

13. The motor housing cooling device according to claim 11, wherein the vibration absorbing pipes are coupled to inner or outer peripheral surfaces of the linear pipes in such a manner as to be erected in up and down directions correspondingly to the linear pipes.

* * * * *